US007693913B2

(12) United States Patent
Goto

(10) Patent No.: US 7,693,913 B2
(45) Date of Patent: Apr. 6, 2010

(54) METHOD AND SYSTEM FOR REMOTE ACCESSING A VIRTUAL DATABASE SYSTEM

(75) Inventor: Hisashi Goto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 81 days.

(21) Appl. No.: 11/448,928

(22) Filed: Jun. 7, 2006

(65) Prior Publication Data

US 2007/0220020 A1 Sep. 20, 2007

(30) Foreign Application Priority Data

Mar. 17, 2006 (JP) ............................ 2006-074611

(51) Int. Cl.
*G06F 7/00* (2006.01)

(52) U.S. Cl. ...................................... 707/792; 707/774

(58) Field of Classification Search ................ 707/100, 707/3

See application file for complete search history.

(56) References Cited

U.S. PATENT DOCUMENTS 5,524,253 A * 6/1996 Pham et al. ................. 709/202
5,721,904 A * 2/1998 Ito et al. ........................ 707/8
6,704,747 B1 * 3/2004 Fong ....................... 707/104.1
7,290,056 B1 * 10/2007 McLaughlin, Jr. .......... 709/230
2003/0105858 A1 * 6/2003 Hogg et al. ................. 709/224

FOREIGN PATENT DOCUMENTS

JP 9-305455 11/1997
JP 10-021125 1/1998

* cited by examiner

*Primary Examiner*—Etienne P LeRoux
*Assistant Examiner*—Cindy Nguyen
(74) *Attorney, Agent, or Firm*—Fujitsu Patent Center

(57) ABSTRACT

A compiler, which makes a computer carry out a process for generating a program used for a remote access to a virtual database comprising a first computer 11 including an application program and a second computer 12 being connected to the first computer 11 by way of a network and including one or more databases, replaces (1*c*) a description part relating to a DML execution process for the virtual database from a source code 7 of the application program with a description relating to an RPC process and generates a program for executing the DML execution process for the native databases based on the RPC process. The use of the program enables a high performance remote database access while applying a virtual database function aiming at facilitating a business logic buildup.

14 Claims, 24 Drawing Sheets

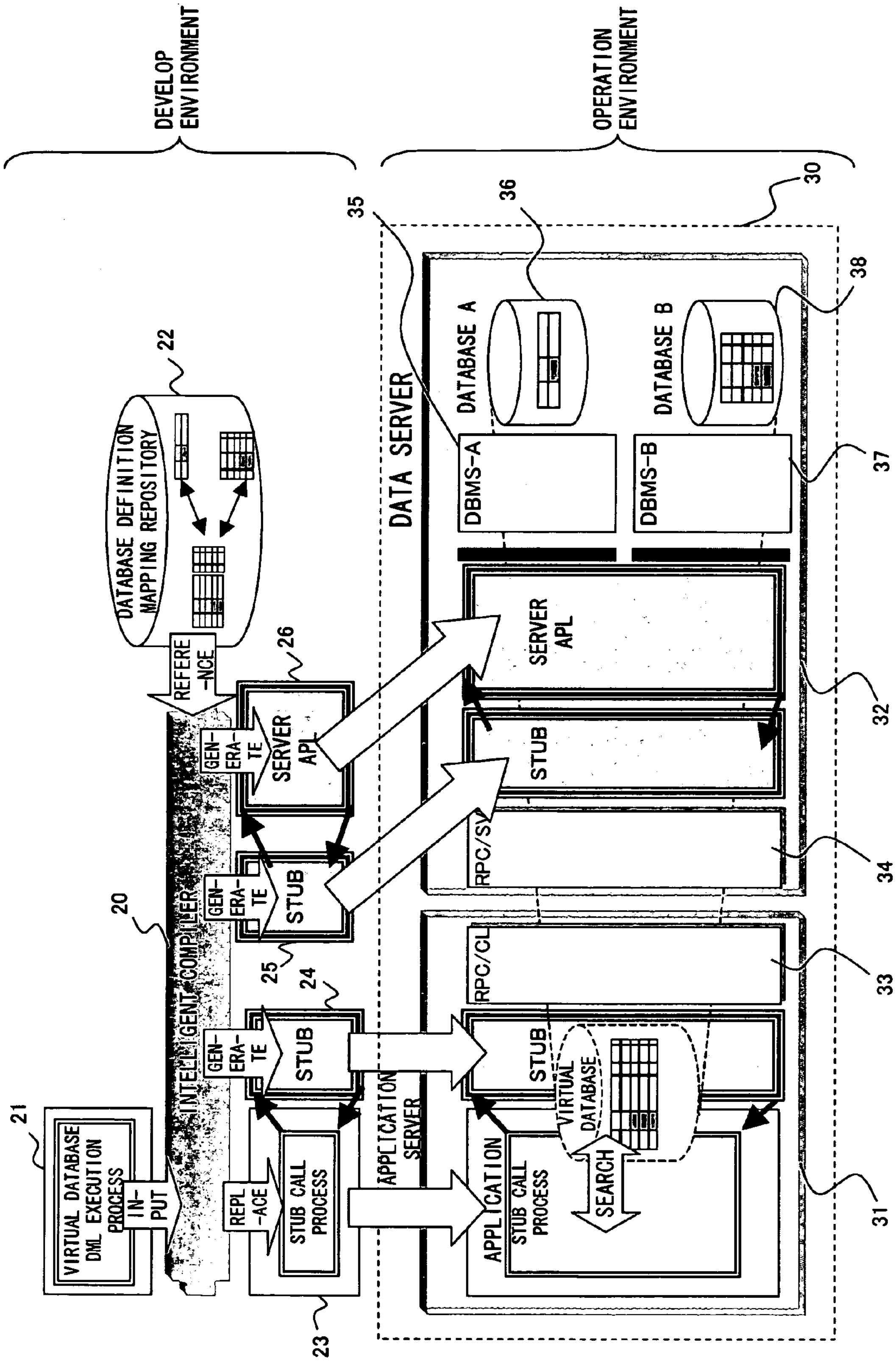
F I G. 6

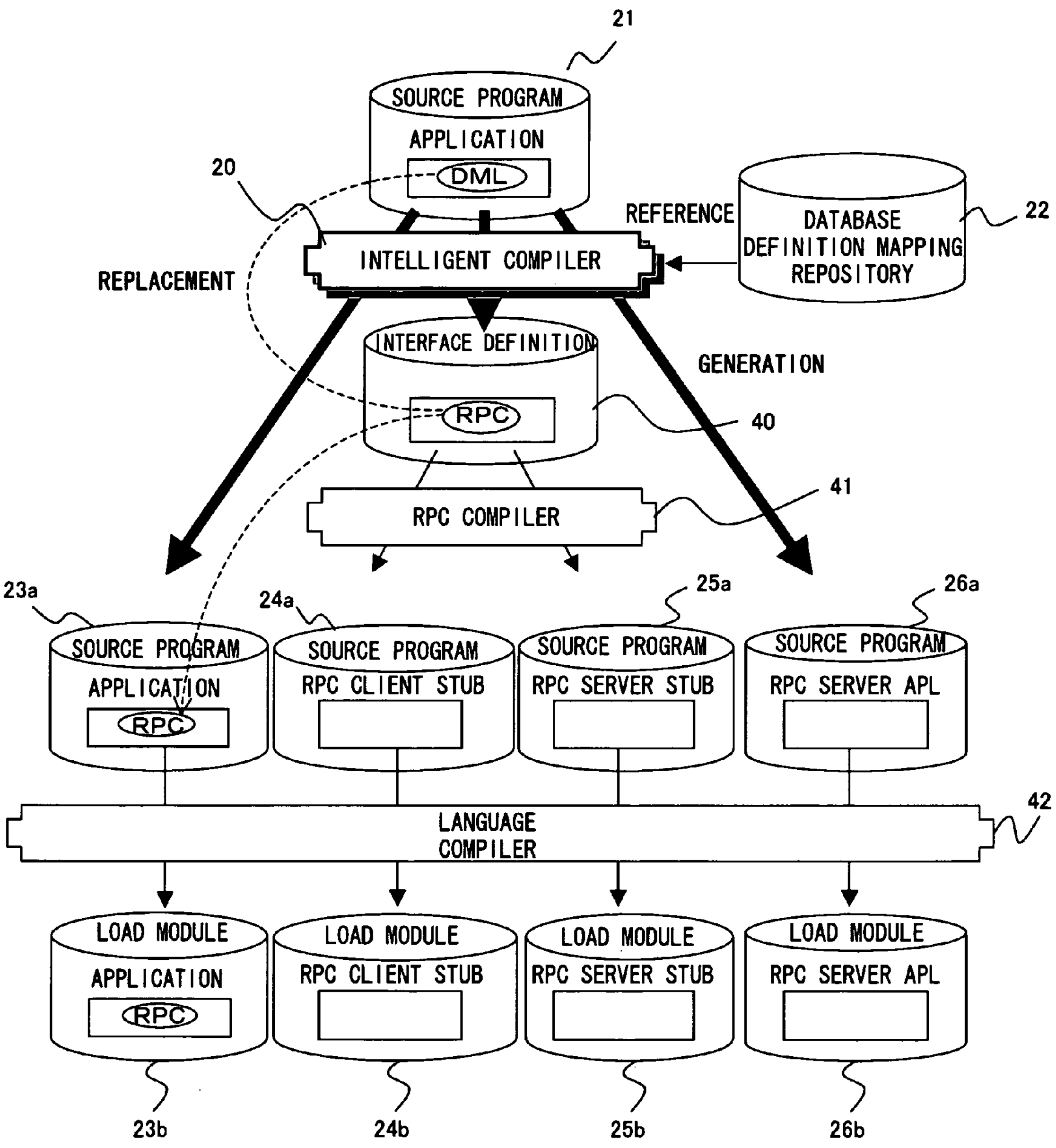
F I G. 7

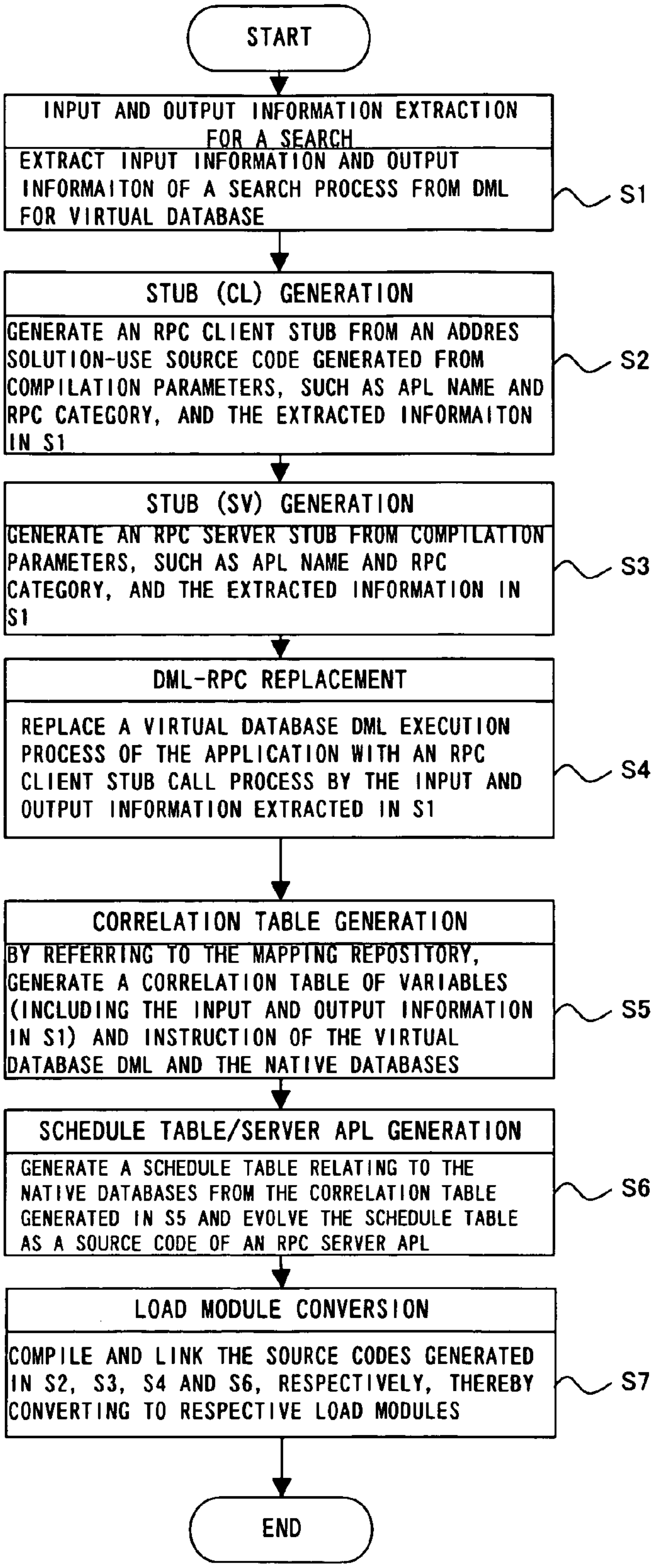
F I G. 9

22

[LOGIC STRUCTURE] (SOCIAL INSURANCE SERVICE SYSTEM)

| DATABASE | RECORD ELEMENT | DATA ATTRIBUTE | CONSTRAINT ATTRIBUTE | CORRELATION |
|---|---|---|---|---|
| DATABASE A | A1 (SUBSCRIPTION DATE) | Date | — | — |
| | A2 (ID NUMBER) | Integer | MAIN KEY | — |
| INSURANCE | A3 (CATEGORY) | Character | — | — |
| DATABASE B | B1 (ADDRESS) | String | — | — |
| | B2 (ID NUMBER) | String | MAIN KEY | — |
| RESIDENT | B3 (FULL NAME) | String | — | — |
| REGISTRATION | B4 (BIRTH DATE) | Date | — | — |
| DATABASE C (VIRTUAL DB) | C1 (SUBSCRIPTION DATE) | Date | — | A. A1 |
| | C2 (ID NUMBER) | Integer | MAIN KEY | A. A2 B. B2 |
| | C3 (CATEGORY) | Character | — | A. A3 |
| | C4 (ADDRESS) | String | — | B. B1 |
| | C5 (FULL NAME) | String | — | B. B3 |
| SEARCH SERVICE | C6 (BIRTH DATE) | Date | — | B. B4 |

FIG. 10

| |
|---|
| INPUT INFORMATION : B1 ⇒ C4 (VALUE= bbb) |
| OUTPUT INFORMATION : ALL ELEMENTS ⇒ C1, C2, C3, C4, C5, C6 |

F I G. 1 1

24a

```
ApplicationServerStub( c4,                                  //INPUT PARAMETER
                   rc, er, c1□, c2□, c3□, c4□, c5□, c6□)//OUTPUT PARAMETER
                                                            // (rc : RETURN CODE)
                                                            // (er : ERROR INFORMATION)

//OBTAIN SERVER APL REFERENCE INFORMATION BY A SERVER APL NAME AS KEY
ServerAplReference sr = rpcXXX_naming_service_lookup("ServerAplDb_C")
        //NAMING SERVICE CORRESPONDING               AUTOMATICALLY GENERATE A
        //TO DESIGNATED RPC CATEGORY AT COMPILATION  SERVER APL NAME
                                                     //(VIRTUAL DATABASE C)
//REQUEST A SERVER APL CALL BY DESIGNATING SERVER APL REFERENCE
//INFORMATION, AND INPUT AND OUTPUT PARAMETERS
rpcXXX_call(sr, c4, _rc, _er, _c1□, _c2□, _c3□, _c4□, _c5□, _c6□)

if _rc == OK          //IS THE PROCESS RESULT NORMAL? ("Yes")
      //STORE INFORMAITON OF A PROCESS RESULT RECEIVER FROM THE SERVER APL IN THE
      //OUTPUT PARAMETERS
      rc = _rc
      c1 = _c1
      c2 = _c2
      c3 = _c3
      c4 = _c4
      c5 = _c5
      c6 = _c6
else                            //IS THE PROCESS RESULT NORMAL? ("No")
      //STORE ERROR INFORMATION RECEIVED FROM THE SERVER APL IN THE
      //OUTPUT PARAMETERS
      rc = _rc
      er = _er
end-if
```

S11 S12 S13 S14 S15

F I G. 1 4

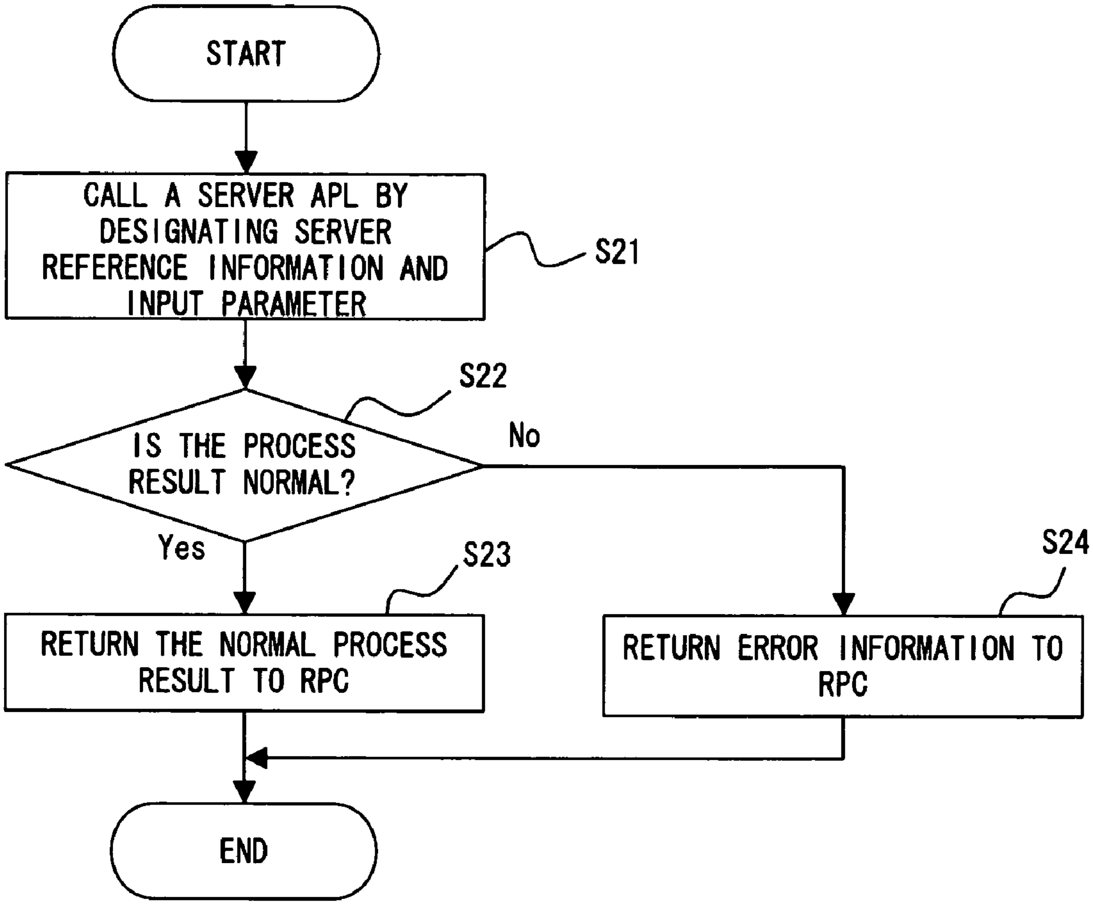
F I G. 1 5

25a

```
DatabaseServerStub( sr, c4,                         //INPUT PARAMETER
                                                    //  (sr : ServerAplReference)
          rc, er, c1[], c2[], c3[], c4[], c5[], c6[])     //OUTPUT PARAMETER

//REQUEST A SERVER APL CALL BY DESIGNATING SERVER APL REFERENCE
//INFORMATION, AND INPUT AND OUTPUT PARAMETERS
ServerAplDb_C (sr, c4, _rc, _er, _c1[], _c2[], _c3[], _c4[], _c5[], _c6[])
//ServerAplDb_C : SERVER APL NAME AUTOMATICALLY GENERATED BY THE
//                COMPILER

if _rc = OK        //IS A PROCESS RESULT NORMAL?  ("Yes")
       //STORE INFORMATION OF THE PROCESS RESULT RECEIVED FROM THE SERVER
       //APL IN THE OUTPUT PARAMETERS
       rc = _rc
       c1 = _c1
       c2 = _c2
       c3 = _c3
       c4 = _c4
       c5 = _c5
       c6 = _c6
else                              //IS THE PROCESS RESULT NORMAL?  ("No")
       //STORE ERROR INFORMATION RECEIVED FROM THE SERVER APL IN THE
       //OUTPUT PARAMETERS
       rc = _rc
       er = _er
end-if
```

S21

S22

S23

S24

F I G. 1 6

21

[PRE-REPLACEMENT]

```
・・・・・・・・
@DML Substitute
ResultSet rs = exec( "SELECT * WHERE C4=bbb" , rc, er)
if  rc = OK
        int i = 0                     //REPEAT WHILE THE NEXT RECOR EXISTS IN
        while(rs.nextExisit = true)   //THE PROCESS RESULT
                c1[i] = rs. next.get( "c1" )
                c2[i] = rs. next.get( "c2" )
                c3[i] = rs. next.get( "c3" )
                c4[i] = rs. next.get( "c4" )
                c5[i] = rs. next.get( "c5" )
                c6[i] = rs. next.get( "c6" )
                i  = i + 1
        end-while
end-if
・・・・・・・・
```

23a

[POST-REPLACEMENT]

```
・・・・・・・・
ApplicationServerStub ( c4, rc, er, c1□, c2□, c3□, c4□, c5□, c6□)
・・・・・・・・
```

| VIRTUAL DATABASE (61) | | | | NATIVE DATABASES (62) | | |
|---|---|---|---|---|---|---|
| DML INSTRUCTION | DML VARIABLES: SOURCE DESCRIPTION | | DML VARIABLES: EXPANDED FORM | DATABASE | RECORD ELEMENT | ATTRIBUTE |
| SELECT | INPUT | C4 | C4(bbb) | B | B1 | String |
| | OUT-PUT | * | C1 | A | A1 | Date |
| | | | C2 | A | A2 | Integer |
| | | | | B | B2 | String |
| | | | C3 | A | A3 | Character |
| | | | C4 | B | B1 | String |
| | | | C5 | B | B3 | String |
| | | | C6 | B | B4 | Date |
| 63 | 64 | | 65 | 66 | 67 | 68 |

F I G. 1 8

70

| PROCESS SEQUENCE | PROCESS CATEGORY | PROCESS CATEGORY | PROCESS CONTENT |
|---|---|---|---|
| Pro1 | ACCESS | B | EXTRACT A RECORD OF THE DATABASE B, OF WHICH THE RECORD ELEMENT B1 IS EQUAL TO bbb |
| Pro2 | DATA CONVERT TYPE | — | CONVERT A VALUE OF A RECORD ELEMENT B2 OF THE PROCESS RESULT RECORD OF THE Pro1 FROM A STRING TYPE (B2) INTO AN INTEGER TYPE (A2) |
| Pro3 | ACCESS | A | EXTRACT A RECORD OF THE DATABASE A, OF WHICH A VALUE OF THE RECORD ELEMENT A2 IS EQUAL TO A VALUE ACQUIRED IN THE Pro2 |
| Pro4 | ASSEMBLE A SEARCH RESULT | A、B | ASSEMBLE A SEARCH RESULT OF A VIRTUAL DATABASE FROM THE SEARCH RESULTS OF THE DATABASES A AND B IN THE Pro2 AND Pro3 |

F I G. 19

26a

```
ServerAplDb_C (sr, c4,                                      //INPUT
        _rc, _er, _c1□, _c2□, _c3□, _c4□, _c5□, _c6□)      //OUTPUT

//SEARCH A PLURALITY OF NATIVE DATABASES ACCORDING TO A SEARCH SCHEDULE
//DETERMIED BY THE COMPILER

//Pro1 : EXTRACT A RECORD OF THE DATABASE B, OF WHICH A RECORD ELEMENT B1
//IS EQUAL TO bbb
//EXTRACT CONDITION DATA FOR A SEARCH FROM THE REQUESTER PARAMETER (AND
//SEARCH RESULT DATA WITHIN A WORK AREA)
b1 = c4

//DESIGNATE THE EXTRACTED CONDITION DATA AND CARRIES OUT A NATIVE DML
ResultSet rs = exec( "SELECT B1, B2, B3, B4 WHERE B1=b1" , rc, er)
if rc = OK                          //IS THE SEARCH RESULT NORMAL? (Yes)
    int i = 0                       //REPEAT WHILE THE NEXT RECORD EXISTS IN THE
    while( rs.nextExisit = true)    //SEARCH RESULT
        //STORE THE RESULT OF CARRYING OUT THE NATIVE DML IN THE WORK
        //AREAS
        b1[i] = rs. next.get( "b1" )
        b2[i] = rs. next.get( "b2" )
        b3[i] = rs. next.get( "b3" )
        b4[i] = rs. next.get( "b4" )
        i = i + 1
    end-while
else                                //RETURN THE ABNORMAL PROCESS RESULT TO
    _rc = rc                        //THE STUB
    _er = er
    return
end-if

//Pro2 : CONVERT THE VALUE OF THE RECORD ELEMENT B2 OF A PROCESS RESULT
//RECORD OF THE Pro1 FROM A STRING TYPE (B2) INTO AN INTEGER TYPE (A2)
    //CARRY OUT THE FOLLOWING PROCESSES FOR EACH ARRAY ELEMENT
    a2[i] = StringToInteger ( b2[i] )
```

S31

S32

S33

S34

S38

Pro1

Pro2

F I G. 2 1 A

26a

```
//Pro3 : EXTRACT A RECORD OF THE DATABASE A, OF WHICH THE VALUE OF A RECORD ELEMENT
//A2 IS EQUAL TO THE VALUE ACQUIRED IN Pro2
        //CARRY OUT THE FOLLOWING PROCESS FOR EACH ARRAY ELEMENT

//EXTRACT CONDITION DATA FOR A SEARCH FROM (A REQUESTER PARAMETER AND) THE
//SEARCH RESULT DATA WITHIN THE WORK AREA
a2 = a2[i]

//DESIGNATE THE EXTRACTED CONDITION DADTA AND CARRIES OUT A NATIVE DML
ResultSet rs = exec( "SELECT A1, A2, A3, WHERE A2=a2" , rc, er)
if  rc = OK                             //IS THE SEARCH RESULT NORMAL? (YES)
        int j = 0
                                        //REPEAT WHILE THE NEXT RECORD EXISTS IN
        while( rs.nextExisit = true)    //THE SEARCH RESULT
                //STORE THE RESULT OF CARRYING OUT THE NATIVE DML IN THE WORK AREAS
                a1[j] = rs. next.get( "a1" )
                a2[j] = rs. next.get( "a2" )
                a3[j] = rs. next.get( "a3" )
                j = j + 1
        end-while
else                                    //RETURN THE ABNORMAL PROCESS RESULT TO THE
        _rc = rc                        //STUB
        _er = er
        return
end-if

//Pro4 : ASSEMBLE A SEARCH RESULT OF THE VIRTUAL DATABASE FROM THE SEARCH
//RESULTS OF THE DATABASES A AND B IN THE Pro2 AND Pro3
        //CARRY OUT THE FOLLOWING PROCESS FOR EACH ARRAY ELEMENT
        _c1[j] = a1[j]
        _c2[j] = a2[j]
        _c3[j] = a3[j]
        _c4[j] = b1[j]
        _c5[j] = b3[j]
        _c6[j] = b4[j]

        //RETURN THE NORMAL PROCESS RESULT
        _rc = OK
        return
```

S31
S32
S33
S34
S38
Pro3
S36
S37
Pro4

F I G. 2 1 B

METHOD AND SYSTEM FOR REMOTE ACCESSING A VIRTUAL DATABASE SYSTEM

BACKGROUND OF THE INVENTION

1. Field of the Invention

The present invention relates to a remote access search technique used for a plurality of databases.

2. Description of the Related Art

FIG. 1 is a conceptual diagram of a remote access to a virtual database. An application 103 of an application server 101 accesses a database A (104) and a database B (105) which are databases (i.e., native databases) existing in a data server 102. A process for virtualizing a plurality of native databases as one database for an application server 101 is programmed in the application 103. Such a database is called a virtual database in the following description.

FIG. 2 shows a conventional virtual database remote access system. Conventionally, in the case of virtualizing and accessing a plurality of databases (i.e., native databases) 104 and 105, as if one database, existing in a computer 102 which is different from a computer 101 in which an application 103 operates, the following process has been carried out:

(1) A virtual database DML parser 111 of a virtual database control 110 of an application server 101 analyzes DML (Data Manipulation Language) of a search request for a virtual database;

(2) Based on the analysis result, a search request disassembly apparatus 112 of a virtual database control 110 of the application server 101 disassembles the DML of the search request into search requests of DMLs (i.e., native DMLs) for the respective databases 104 and 105;

(3) Respective DBMSs (Database Management systems) 117 and 118 execute the disassembled native DMLs by way of a remote access client control 115 and a remote access server control 116, and transmit/receive the execution result in the reverse route;

(4) A search result assembling apparatus 113 of a virtual database control 110 of the application server 101 assembles the execution results of the native DMLs of the respective DBMSs 117 and 118. The assembled execution result is returned to the application 103 as the search result for the virtual database; and (5) Note that, when carrying out each of the processes, i.e., the analysis described in the above paragraph (1), the division described in the above paragraph (2), and the assembly described in the above paragraph (4), a relation definition of a logical structure between the virtual database and each database, which is managed by a mapping repository 114, is referred to.

As described above, a correlation for virtualizing a plurality of databases as one database for an application is defined for the application on a client side (i.e., a facilitation of a business logic buildup).

As such, although a virtual database is seemingly one database viewed from an application, it actually corresponds to a plurality of databases. Consequently, there is a case of being unable to request individual databases for parallel accesses, thus requiring a sequential access. Besides, a part of search results is sometimes unnecessary and accordingly discarded at the time of finally summarizing the search results.

This is caused by the problem of schedule logic of a native DML at the time of a division execution of the DML for a virtual database and the problem of dependency of a search result, that is, a validity of a result of processing each native DML is unknown until the processing results are assembled together.

Due to the above described problems, the conventional remote access to a virtual database, while providing the advantage of facilitating a buildup of an application, accompanies the disadvantage of an inefficient access with a large overhead, hence it makes difficult to apply to an actual business.

FIG. 3 shows a conventional concrete example of search result dependency, that is, a search of the database A must be preceded by validating a search result of the database B. A record of the database A (104) and that of the database B (105) are correlated by common data items A2 and B2 respectively.

A DML meaning "extract a record where B1 is equal to "bbb"" is defined in the application 103.

In this case, the application server 101 first requests the data server 102 to extract a record of the B1 being equal to "bbb", from the database B (step 101; "step" is abbreviated as "S" hereinafter).

And, records RB2 and RB4 are extracted from the database B and transmitted to the application server 101 (S102).

The application server 101 requests the data server 102 for extracting a record of which the A2 is equal to the B2 of the records RB2 and RB4 from the database A (S103).

And, records RA1 and RA2 are extracted from the database A and transmitted to the application server 101 (S104).

As such, the data items A2/B2 cannot be identified until the database B has been searched because the search condition is one relating to a data item B1 (i.e., B1=bbb; that is, to extract a record of which the B1 is equal to bbb) of a record of the database B.

Consequently, the problem of the conventional method lies in the fact that an overhead becomes large at a time of executing an access because of converting, at the aforementioned time, a virtual database DML process into a native database DML process (i.e., analysis, disassembly and assembly) based on a definition of a relationship of logical structures between the virtual database and native database. Moreover, there is another problem of a bloating telecommunication overhead (i.e., the number of communications and/or a transmission volume) at the time of execution due to a dependency of data.

FIG. 4 exemplifies the case of designing a business system by a conventional configuration in which both applications of an application server and a data server collaborate with each other. Such a configuration is used for a stored procedure.

The above described configuration is used for designing a business system if a performance is emphasized for the system from the outset. However, it has been faced with the problem of levying a large load on the development entity for developing it because of requiring a design adjusting interfaces for both of the applications.

Meanwhile, a Laid-Open Japanese Patent Application Publication No. 10-21125 is disclosed as a technique relating to the present invention.

SUMMARY OF THE INVENTION

In consideration of the problem noted above, the present invention provides a compiler for securing a performance at the time of an execution while reducing a load for a design for a remote access method for a virtual database and a virtual database remote access system which is equipped with a program generated by the aforementioned compiler.

According to the present invention, a storage medium storing a compilation program making a computer execute a process for generating a program for use in a remote access to a virtual database comprising a first computer furnished with an application program receiving a prescribed input parameter from a user, comprising a second computer which is connected to the first computer by way of a network and which includes one or more databases and virtualizing native databases, as one data base, which are one or more databases for an application program, comprises: an RPC replacement process for replacing a description part relating to a data manipulation language (DML) execution process for the virtual database from a source code of the application program with a description relating to a remote procedure call (RPC) process; and a native DML execution program generation process for generating a native DML execution program which is a program for executing a DML execution process for the native databases based on the RPC process.

According to the present invention, a production method for a virtual database remote access-use program for generating a program for use in a remote access to a virtual database comprising a first computer furnished with an application program receiving a prescribed input parameter from a user, comprising a second computer which is connected to the first computer by way of a network and which includes one or more databases and virtualizing native databases, as one data base, which are one or more databases for an application program, carries out: replacing a description part relating to a data manipulation language (DML) execution process for the virtual database from a source code of the application program with a description relating to a remote procedure call (RPC) process; and generating a native DML execution program that is a program for executing a DML execution process for the native databases based on the RPC process.

According to the present invention, a remote access method for a virtual database comprising a first computer furnished with an application program receiving a prescribed input parameter from a user, comprising a second computer which is connected to the first computer by way of a network and which includes one or more databases and virtualizing native databases, as one database, which are one or more databases for an application program, carries out: the first computer stores the application program and a first interface for carrying out a Remote Procedure Call (RPC); the second computer stores a native Data Manipulation Language (DML) execution program for executing a DML execution process for the native databases and a second interface for carrying out the Remote Procedure Call (RPC); the application program, having received the input parameter, calls the first interface; the first interface hands the input parameter to the second interface by an RPC; having received the input parameter from the second interface, the native DML execution program carries out the DML execution process for each of the native databases and assembles the execution results obtained from the respective native databases for making one execution result; and the assembled one execution result as an execution result of the virtual database is provided.

BRIEF DESCRIPTION OF THE DRAWINGS

FIG. 6 shows an intelligent compiler and a virtual database remote access system according to the present embodiment;

FIG. 7 shows a function of an intelligent compiler 20 according to the present embodiment;

FIG. 9 shows a process flow of the intelligent compiler 20 according to the present embodiment;

FIG. 10 exemplifies a logical structure of a native database and a virtual database;

FIG. 11 exemplifies input and output information extracted by an "input and output information extraction" process in S1;

FIG. 14 exemplifies a simplified pseudo-code corresponding to the flow chart shown by FIG. 12;

FIG. 15 shows a flow chart of a STUB 25 generated by a "STUB (SV) generation" process in S3;

FIG. 16 exemplifies a simplified pseudo-code corresponding to the flow chart shown by FIG. 15;

FIG. 17 shows source codes of an application in the pre- and post-"DML RPC replacement process (S4)";

FIG. 18 shows a correlation table generated in S5;

FIG. 19 shows a schedule table 70 generated in S6;

FIG. 21A exemplifies a simplified pseudo-code corresponding to the flow chart shown by FIG. 20 (part 1);

FIG. 21B exemplifies a simplified pseudo-code corresponding to the flow chart shown by FIG. 20 (part 2);

DESCRIPTION OF THE PREFERRED EMBODIMENTS

Figure 1:
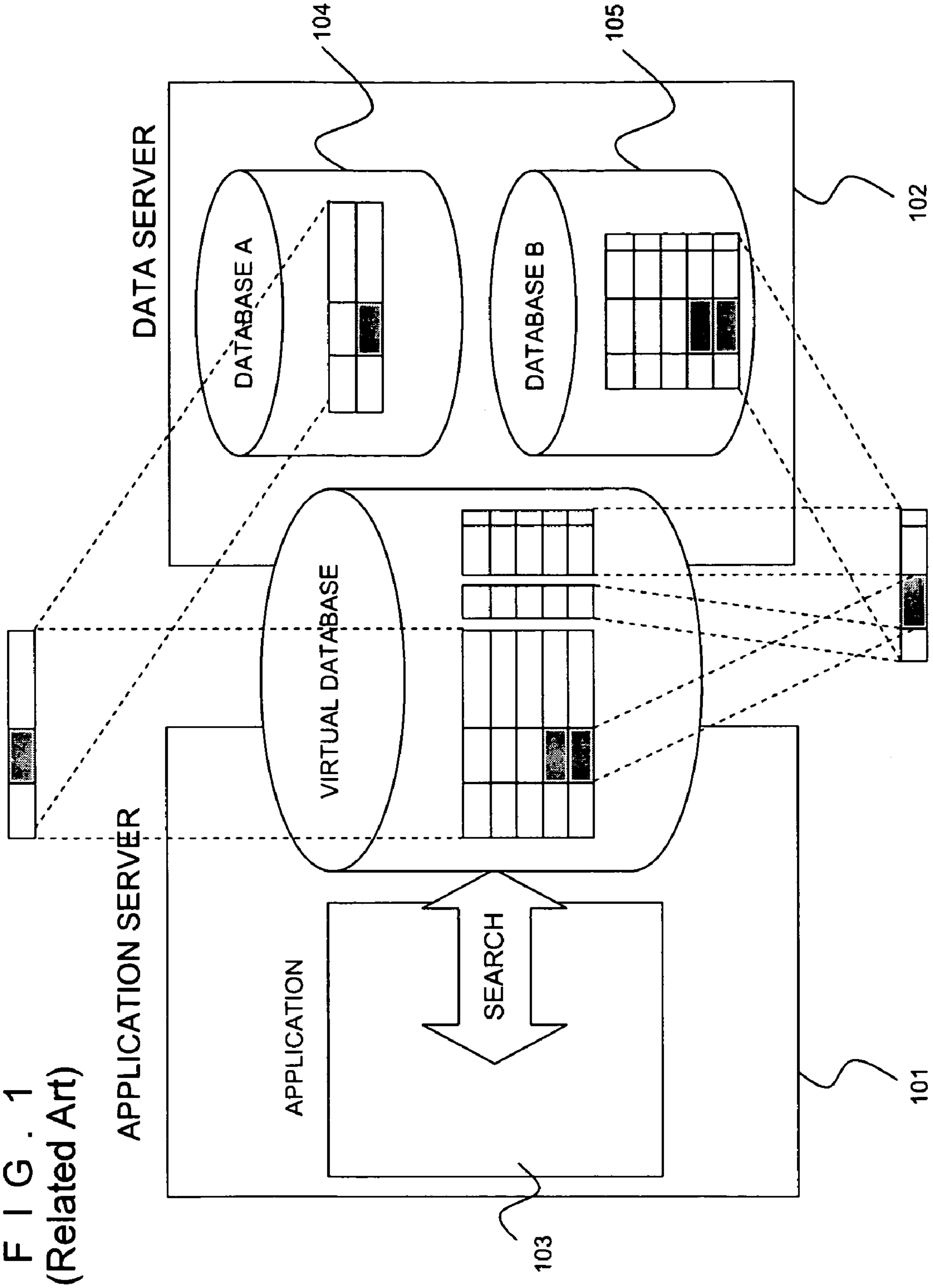
FIG. 1 is a conceptual diagram of a remote access to a virtual database.

According to the present invention, a compilation program making a computer execute a process for generating a program for use in a remote access to a virtual database comprising a first computer furnished with an application program receiving a prescribed input parameter from a user, comprising a second computer which is connected to the first computer by way of a network and which includes one or more databases and virtualizing native databases, as one database, which are one or more databases for an application program, wherein the program makes the computer execute an RPC replacement process for replacing a description part relating to a data manipulation language (DML) execution process for the virtual database from a source code of the application program with a description relating to a remote procedure call (RPC) process; and a native DML execution program generation process for generating a native DML execution program that is a program for executing a DML execution process for the native databases based on the RPC process.

Such a configuration makes it possible to generate a program used for a remote access to a virtual database in an RPC environment.

The compilation program further makes the computer carry out a source code input process for receiving a source code of the application program, and an input and output information extraction process for extracting input and output information relating to a DML execution process for the virtual database from the source code.

Such a configuration makes it possible to generate a program used for a remote access to a virtual database in an RPC environment easily from an application program describing a DML execution process for the virtual database.

The compilation program further makes the computer carry out an interface generation process for generating a first interface stored in the first computer and a second interface stored in the second computer in order to use the RPC.

Such a configuration also makes it possible to generate an RPC client STUB and an RPC server STUB.

According to the present invention, a production method for a virtual database remote access-use program for generating a program for use in a remote access to a virtual database comprising a first computer furnished with an application program receiving a prescribed input parameter from a user, comprising a second computer which is connected to the first computer by way of a network and which includes one or more databases and virtualizing native databases, as one data base, which are one or more databases for an application program, carries out: replacing a description part relating to a data manipulation language (DML) execution process for the virtual database from a source code of the application program with a description relating to a Remote Procedure Call (RPC) process; and generating a native DML execution program that is a program for executing a DML execution process for the native databases based on the RPC process.

Such a configuration makes it possible to generate a program used for a remote access to a virtual database in an RPC environment.

According to the present invention, a remote access method for a virtual database comprising a first computer furnished with an application program receiving a prescribed input parameter from a user, comprising a second computer which is connected to the first computer by way of a network and which includes one or more databases and virtualizing native databases, as one database, which are one or more databases for an application program, carries out: the first computer stores the application program and a first interface for carrying out a Remote Procedure Call (RPC); the second computer stores a native Data Manipulation Language (DML) execution program for executing a DML execution process for the native databases and a second interface for carrying out a Remote Procedure Call (RPC); the application program, having received the input parameter, calls the first interface; the first interface hands the input parameter to the second interface by an RPC; having received the input parameter from the second interface, the native DML execution program carries out the DML execution process for each of the native databases and assembles the execution results obtained from the respective native databases for making one execution result; and the assembled one execution result as an execution result of the virtual database is provided.

Such a configuration requires only one return communication between the first and second computers by using an RPC, thereby enabling a high performance remote database access while applying a virtual database function.

Figure 5:
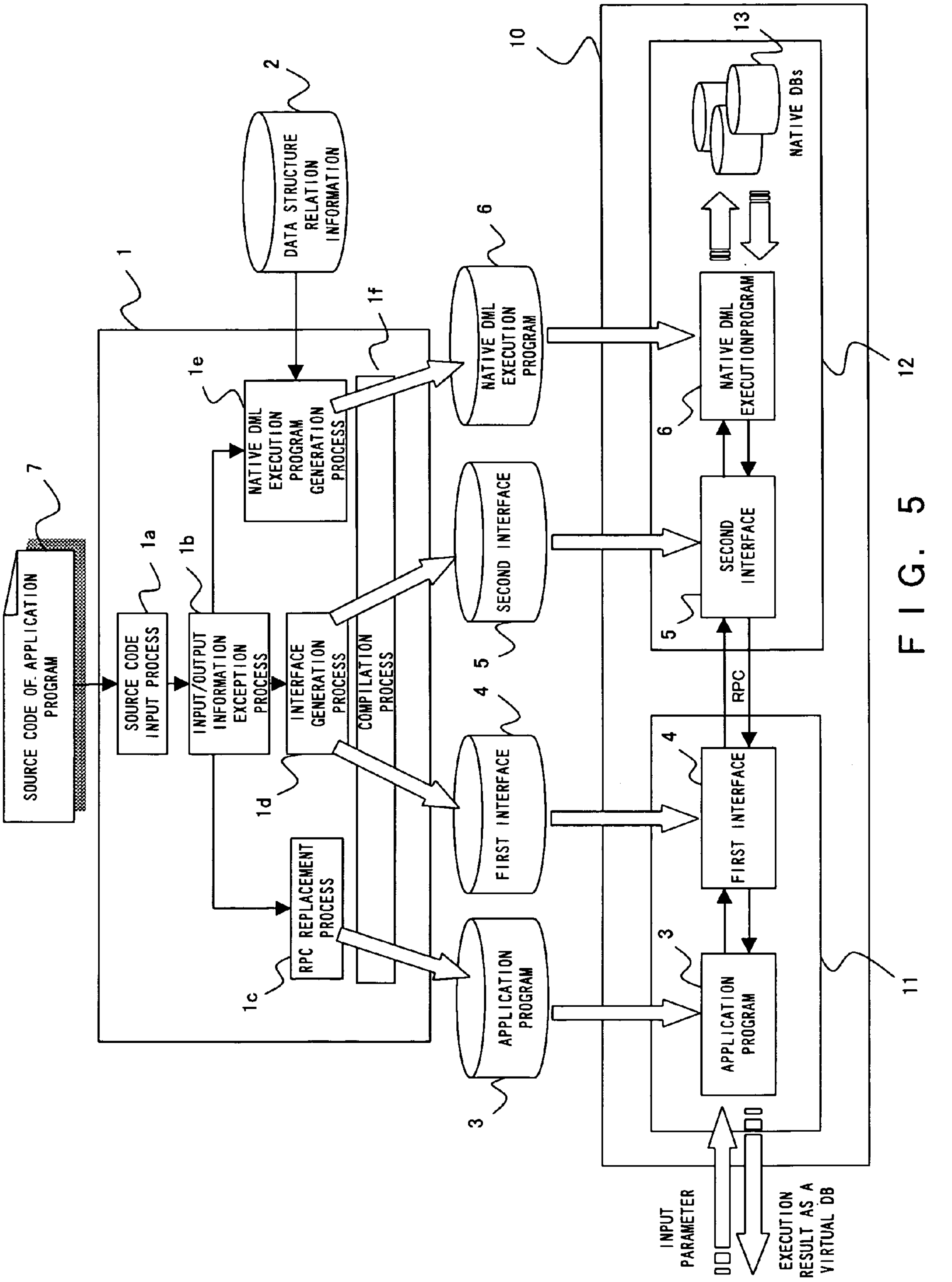
FIG. 5 shows a conceptual diagram of a configuration of a virtual database remote access system and a compiler for generating a program of accomplishing the system according to the present invention.

FIG. 5 shows a conceptual diagram of a configuration of a virtual database remote access system and a compiler for generating a program of accomplishing the system according to the present invention.

A compiler (i.e., an intelligent compiler) 1 according to the present invention generates a program used for a remote access to a virtual database comprising a first computer 11 furnished with an application program 3 receiving a prescribed input parameter from a user, comprising a second computer 12 which is connected to the first computer 11 by way of a network and which includes one or more native databases 13 and virtualizing native databases 13, as one data base, which are one or more databases for the application program 3 virtualizing one or more native databases, as one database, for the application program 3.

The compiler 1 according to the present invention carries out a source code input process 1*a*, an input/output information extraction process 1*b*, an RPC replacement process 1*c*, an interface generation process 1*d*, a native DML execution program generation process 1*e* and a compilation process 1*f*.

The source code input process 1*a* receives an input of the source code 7 of the application program. The input/output information extraction process 1*b* extracts input/output information relating to a DML execution process for a virtual database from the source code 7.

The RPC replacement process 1*c* replaces a description part relating to a Data Manipulation Language (DML) execution process for the virtual database from the source code 7 with a description relating to a Remote Procedure Call (RPC) process.

The interface generation process 1*d* generates a first interface to be stored in the first computer (i.e., a client) and a second interface to be stored in the second computer (i.e., a server) in order to use the RPC.

The native DML execution program generation process 1*e* generates a program for carrying out a DML execution process (i.e., a native DML execution program) for the native databases based on the RPC.

The native DML execution program generation process 1*e* first generates correlation information (i.e., a correlation table) for indicating a correlation among an instruction and variables included in the DML execution process for the virtual database, the extracted input/output information and the native databases based on data structure relation information (i.e., a mapping repository) 2 storing information relating to a relationship of data structures between the native databases and the virtual database.

The native DML execution program generation process 1*e* further generates schedule information (i.e., a schedule table) of a process carried out by the aforementioned native DML execution program generation process based on the correlation table.

The compilation process 1*f* compiles a source code in which a description part relating to the DML execution process has been replaced by a description relating to an RPC process, a source code relating to the first interface, a source code relating to the second interface and a source code of the native DML execution program, thereby generating the respective load modules (i.e., the application program 3, first interface 4, second interface 5 and native DML execution program 6).

The next description is of a virtual database remote access system 10 according to the present invention using the application program 3, first interface 4, second interface 5 and native DML execution program 6 which are generated by the compiler 1 according to the present invention.

The virtual database remote access system 10 includes at least a first computer 11 and a second computer 12. The first computer 11 stores the application program 3 and interface 4. The second computer 12 stores the second interface 5 and native DML execution program 6.

Having received an input parameter from the user, the application program 3 calls the first interface 4 which in turn hands the input parameter to the second interface 5 by an RPC.

Having been handed over the input parameter from the second interface 5, the native DML execution program 6 carries out a DML execution process for each of native databases 13 and assembles the execution results obtained from each of the native databases 13 for making it one execution result, followed by providing the user with the assembled one execution result as an execution result of the virtual database.

In this event, native DML execution program 6 is capable of carrying out a DML execution process for another native database based on an execution result of a DML execution process for one native database among a plurality of the native databases.

Now, the following detailed description is of an embodiment according to the present invention.

FIG. 6 shows an intelligent compiler and a virtual database remote access system according to the present embodiment. A remarkable difference between the conventional method and the method according to the present invention is that the conventional method is based on a Remote Database Access (RDA) whereas the present invention is based on a Remote Procedure Call (RPC).

The present invention provides an intelligent compiler having the following functions:

(1) Replacing a DML execution process for a virtual database described in an application program with a Remote Procedure Call (RPC) process for a server APL (APL: application) operating in a data server; (2) furthermore, generating a program for a server APL comprising logic of accessing a plurality of native databases and assembling the process results; and (3) the compiler generates a server APL and also a STUB program for the RPC.

Now the description proceeds to FIG. 6. Referring to FIG. 6, the virtual database remote access system 30 comprises an application server 31 (corresponding to a client in the present embodiment) and a data server 32 (corresponding to a server in the present embodiment).

The application server 31 comprises an application program (simply "application" hereinafter) 23, an RPC client side STUB program (simply "RPC client STUB" hereinafter) 24 and an RPC/CL (Remote Procedure Call client side control unit) 33.

The data server 32 comprises an RPC server side STUB program (simply "RPC server STUB" hereinafter) 25, a server application program (simply "server APL" hereinafter) 26, an RPC/SV (Remote Procedure Call server side control unit) 34, a DBMS-A (35), a database A (36), a DBMS-B (37) and a database B (38). Note that the database A and database B are substantial databases constituting a virtual database and therefore native databases.

The user inputs a search condition (i.e., an input parameter) to the virtual database remote access system 30. That is, the input parameter is input to the application 23 of the application server 31.

A STUB call process of the application 23 calls the RPC client STUB 24. The input parameter is handed to the server APL 26 by an RPC by way of the RPC client STUB 24 and RPC server STUB 25.

The server APL 26 requests each DBMS-A and -B for a search by the input parameter as the search condition. The individual DBMSs carries out search processes to the respective databases A and B, and hand the respective search result to the server APL 26.

The server APL 26 assembles the search results obtained from the respective DBMSs for making it a search result as a virtual database, and hands the search result of a virtual database to the RPC server STUB 25. The search result of the virtual database is notified to the RPC client STUB 24 by RPC. The search result of the virtual database is handed from the RPC client STUB 24 to the application 23 for providing the user.

Now, the above noted four programs (i.e., the application 23, RPC client STUB 24, RPC server STUB 25 and server APL 26) are required for accomplishing the above described virtual database remote access system. Accordingly, the present invention is contrived to use the intelligent compiler 20.

A compilation is carried out for a source code 21 of an application describing a DML execution process for a virtual database (simply "virtual database DML execution process" hereinafter) by using the intelligent compiler 20. It is followed by the intelligent compiler 20 referring to a mapping repository 22 which defines database, thereby generating the application 23, RPC client STUB 24, RPC server STUB 25 and server APL 26 with a virtual database execution part of the source code 21 having been replaced with a STUB call process for calling the RPC client STUB 24.

The application 23, RPC client STUB 24, RPC server STUB 25 and server APL 26 which are generated by such a development environment are equipped on an execution environment (i.e., the application server 31 and data server 32).

As described above, the present embodiment is configured as a combination between an intelligent compiler, which carries out a compilation process while importing a correlation definition of logical structures of a virtual database and native databases at the time of compiling an application, and a Remote Procedure Call (RPC) mechanism which is a telecommunication function between applications in a distributed system environment.

FIG. 7 shows a function of the intelligent compiler 20 according to the present embodiment.

The name "intelligent compiler" comes from the fact that the compiler according to the present invention comprises not simply the function of "(i) language compiler" and "(ii) RPC compiler" but also that of a plus-alpha, i.e., (i)+(ii)+$\alpha$.

The function of (i): generates a load module from a source program as input.

The function of (ii): generates a STUB (i.e., client/server) from input/output information as input.

The function of $\alpha$: replace a DML as input with an RPC for making a server APL.

The process of the $\alpha$ part (i.e., generation of a STUB and a server APL by referring to a mapping repository) can only be carried out by equipping a "virtual database DML parser function" of the virtual database control. With the virtual database DML parser function being regarded as being intelligent, this is a compiler equipped with the intelligence. This is the reason for the naming.

Referring to FIG. 7, as a source program 21 of an application including the virtual database DML execution process is input, the intelligent compiler 20 refers to the database definition mapping repository 22 and, first, four source programs 23*a*, 24*a*, 25*a* and 26*a*.

The source program 23*a* is a source code replacing the "virtual database DML execution process" of the source program 21 with a process for calling the RPC client STUB 24 in order to carry out an "RPC".

The source programs 24*a* and 25*a* are a STUB of an RPC on the client side and that of an RPC on the server side, respectively, which are obtained as a result of the RPC compiler compiling the RPC based on an interface definition 40.

The source program 26*a* is a program for collecting a search result by performing a search process for each native database based on the mapping repository 22 and assembling a search result obtained from each native data base for making a search result as a virtual database.

The four source programs 23*a*, 24*a*, 25*a* and 26*a* become load modules 23*b*, 24*b*, 25*b* and 26*b*, respectively as a result of being compiled by a language compiler 42.

Figure 8:
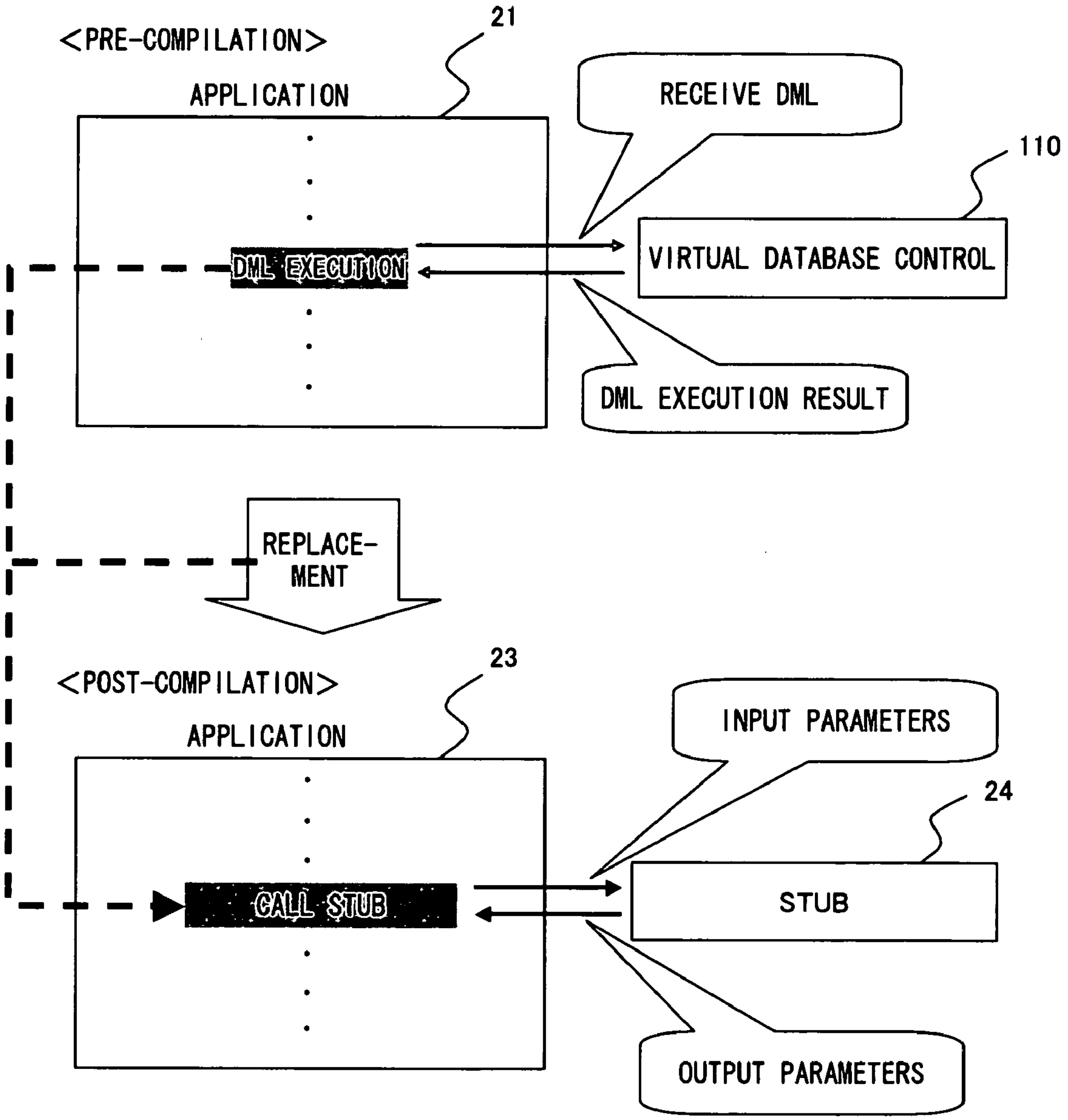
FIG. 8 shows a usage example of the intelligent compiler 20 according to the present embodiment.

FIG. 8 shows a usage example of the intelligent compiler 20 according to the present embodiment. FIG. 8 is for simply describing process logic replacing the "DML execution" part with a "STUB call".

The following description exemplifies the case of a developer creating a predefined application by using a personal computer (PC). Note that the mapping repository 22 is generated in advance.

Figure 2:
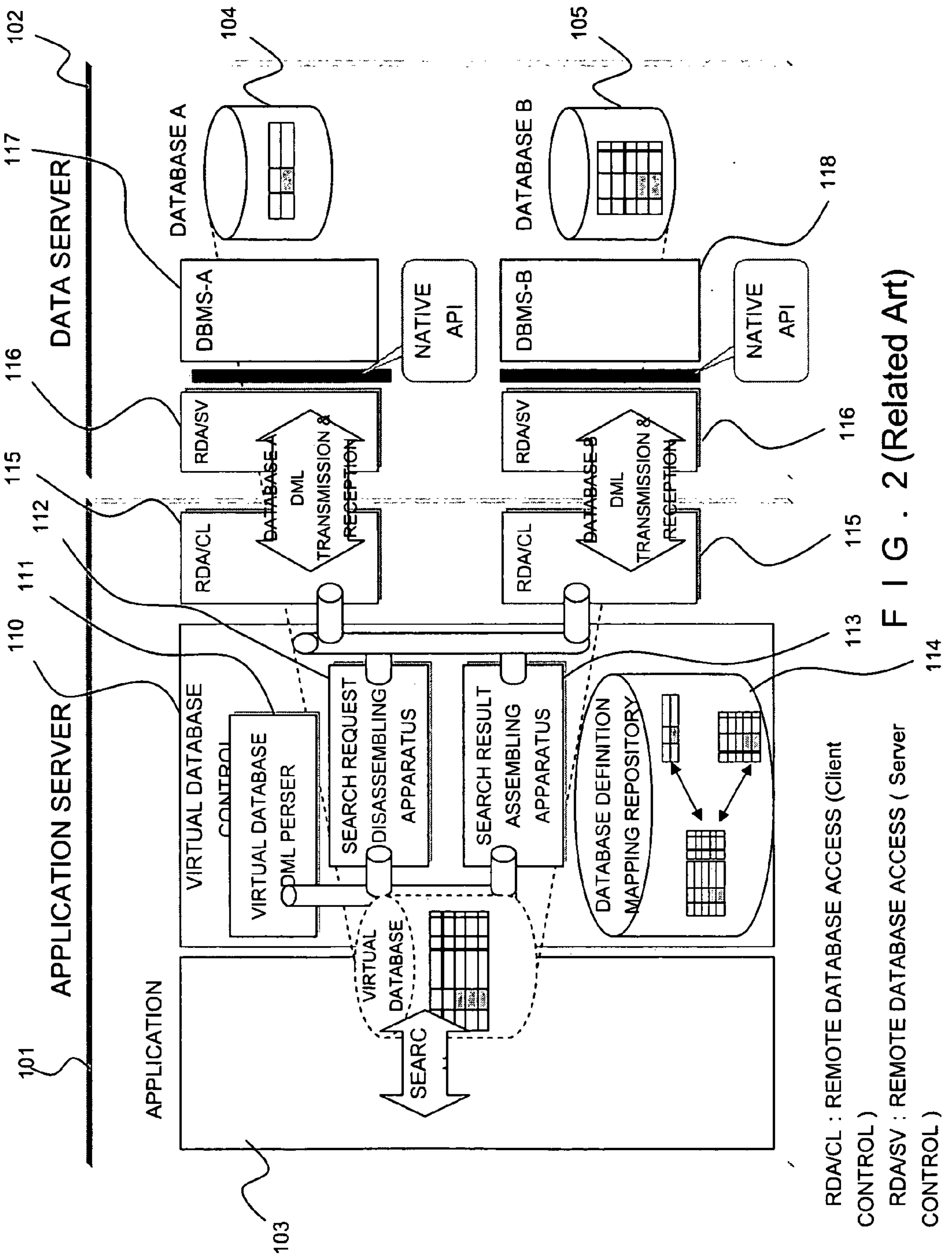
FIG. 2 shows a conventional virtual database remote access system.
Figure 3:
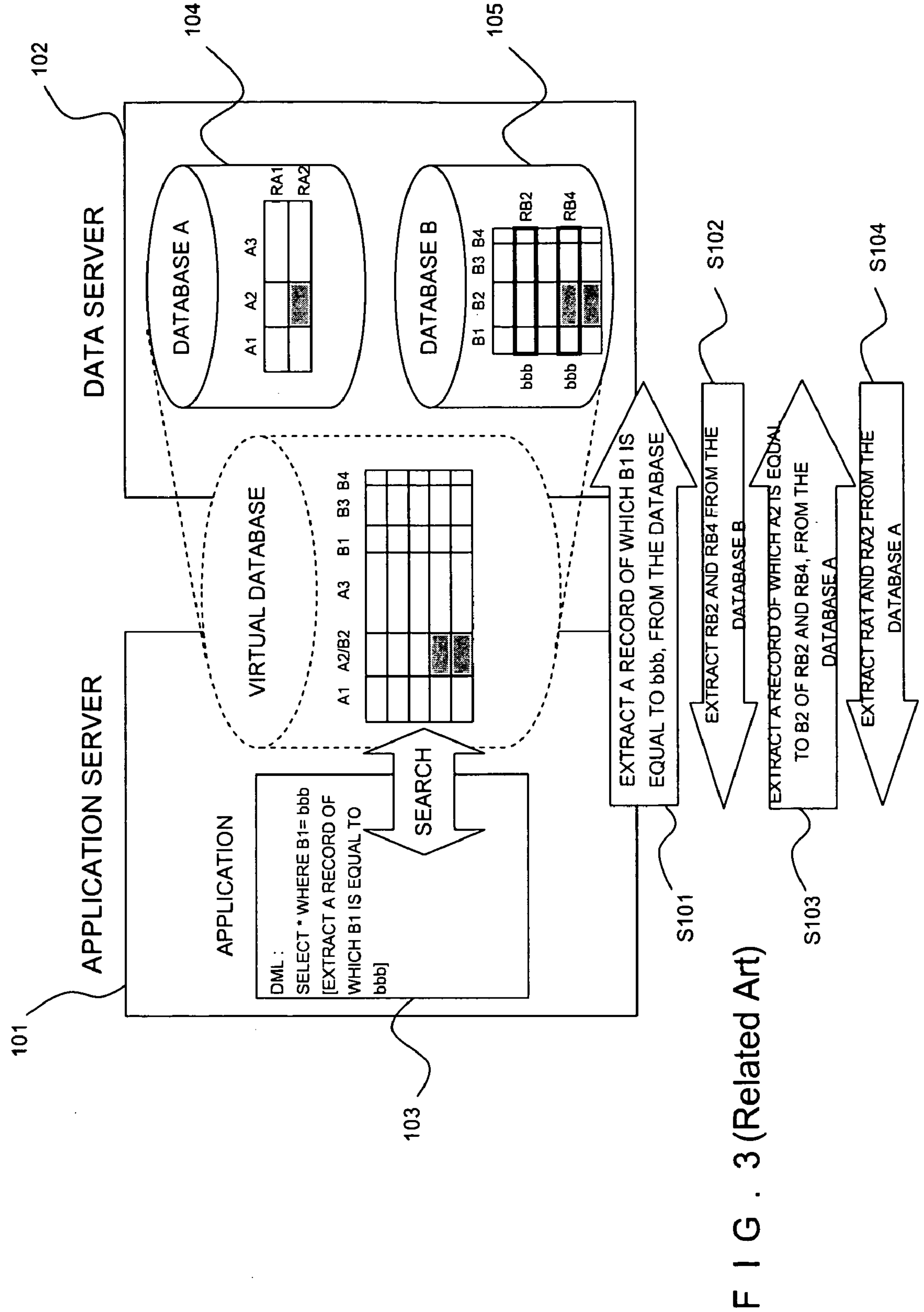
FIG. 3 shows a conventional concrete example of research result dependency, i.e., a search of the database A must be preceded by validating a search result of the database B.
Figure 4:
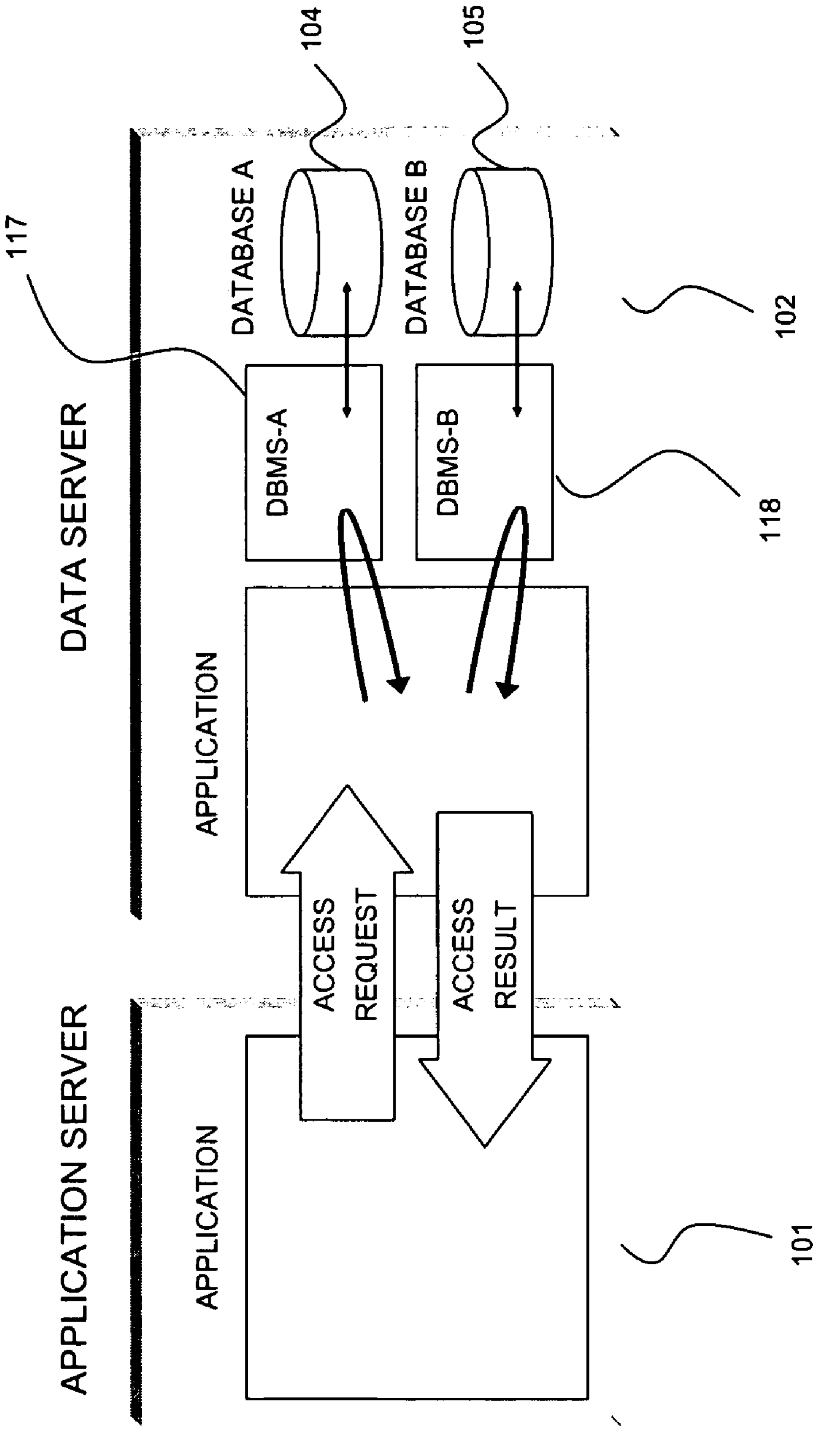
FIG. 4 exemplifies the case of designing a business system by a conventional configuration in which both applications of an application server and a data server collaborate with each other.

A DML execution process for a virtual database is described in the source program 21 of the application 23. If nothing else occurs, a DML is handed to a virtual database control 110 (refer to FIG. 2) and a DML process result is returned therefrom, as in the case of a conventional method.

As the intelligent compiler 20 compiles the source program 21, it obtains an application 23 in which a part corresponding to a pre-compilation "DML execution" process is replaced by a post-compilation "STUB call" process.

Handing the input parameter to the STUB called by the "STUB call" process obtains an output parameter.

The next is a detailed description of a process carried out by the intelligent compiler 20.

FIG. 9 shows a process flow of the intelligent compiler 20 according to the present embodiment. As the source program 21 of the DML execution process relating to a virtual database is input as described above, the intelligent compiler 20 refers to the database definition mapping repository 22 and carries out the following process in order to generate the four programs.

First, it carries out an "input and output information extraction process for a search" (S1), therein extracting input information and output information of a search process from the DML, for the virtual database, of the source code 21 of the application.

Then it carries out a "STUB (CL: client) generation" process (S2), therein generating an RPC client STUB 24*a* (which is a source code) from an address solution-use source code (which will be described later) generated from compilation parameters, such as APL name and RPC category, and the extracted information in the S1.

Then it carries out a "STUB (SV: server) generation" process (S3), therein generating an RPC server STUB 25*a* (which is a source code) from compilation parameters, such as APL name and RPC category, and the extracted information in the S1.

Then it carries out a "DML-RPC replacement" process (S4), therein generating a source code 23*a* of the application in which a virtual database DML execution process of the application is replaced by an RPC client STUB call process by the input and output information extracted in the S1.

Then it carries out a "correlation table generation" process (S5), therein referring to the mapping repository 22 and generating a correlation table of variables (including the input and output information in the S1) and instruction of the virtual database DML and the native databases.

Then it carries out a "schedule table/server APL generation" process (S6), therein generating a schedule table relating to the native databases from the correlation table generated in the S5, followed by expanding the schedule table as a source code 26*a* of an RPC server APL.

Then it carries out a "load module conversion" process (S7), therein compiling and linking the source codes 23*a*, 24*a*, 25*a* and 26*a* which have been generated in the steps S2, S3, S4 and S6, respectively, thereby converting to load modules 23*b*, 24*b*, 25*b* and 26*b*, respectively.

FIG. 10 exemplifies a logical structure of a native database and a virtual database. The following is a description of logical structures of native databases and a virtual database by exemplifying a social insurance service system.

FIG. 10 shows logical structures of a database A (i.e., a native DB), a database B (i.e., a native DB) and a database C (i.e., a virtual DB). The database A (a native DB) relates to an insurance. The database B (a native DB) relates to a resident registration card. The database C (a virtual DB) is used for a search service.

The data base A includes "A1 (subscription date)", "A2 (identification number)" (i.e., a constraint attribute: main key) and "A3 (category), as record elements.

The database B includes "B1 (address)", "B2 (identification number)" (i.e., a constraint attribute: main key), "B3 (full name)" and "B4 (birth date)", as record elements.

The database C is one virtually comprising by relating the "A2 (identification number)" (data attribute: Integer) of the database A with the B2 (identification number)" (data attribute: String) of the database B. The database C includes "C1 (subscription date)", "C2 (identification number)", "C3 (category)", "C4 (address)", "C5 (full name) and "C6 (birth date)", as record elements.

The logical structures are defined in the mapping repository 22 in advance. The mapping repository 22 enables a reference to a correlation of record elements between a virtual DB (i.e., the database C) and native DBs (i.e., the databases A and B).

Note that it is possible to perform a data type conversion (inter-conversion between a String and an Integer) in order to absorb the difference of data attributes between the databases A and B by referring to the data attributes in the mapping repository 22 at the time of processing an identification number, as described later.

The following is descriptions of a process of the intelligent compiler 20 and a process of a program generated thereby, by taking the sample shown by FIG. 10 as parameters while referring to FIG. 9 and other applicable drawings.

Note that a programming description of a source code which is generated by the intelligent compiler 20 differs with the kind of programming language (e.g., Java, COBOL, C, C++, Visual Basic, et cetera) selected by a user. The implementation according to the present embodiment specifies the kind of programming language as an execution instruction parameter for the compiler and performs the generation of a source code and conversion to a load module based on the specification. A fraction of a source code hereinafter is a pseudo-code good enough to communicate process logic of the source code, in place of a description based on a specific programming language specification.

Note that a handling of a data structure in a search process for a database differs with the kind thereof (i.e., a relational database, a network database, an XML database, et cetera) and the kind of programming language. For instance, a plurality of records as a search result (i.e., output information) is expressed as an object, i.e., "ResultSet", in the case of handling a relational database according to the Java, while it is expressed as a buffer within a DBMS in the case of handling a network database by the COBOL, and either case is followed by being copied, and processed, in a record work area of an application by the unit of record. In the examples of a source code described later, the handlings are such as to hand over a plurality of records of a search result by "ResultSet" for an application, while hand over information by a head address of an array which is expressed by an array of record elements for an RPC system.

Referring to FIG. 9, it is assumed that an application source program as the target of compilation by the intelligent compiler 20 includes the following DML for the virtual database C for instance. In the S1 (i.e., an input and output information extraction of a search), the input and output information shown in FIG. 11 is extracted from the content of:

*DML* (SELECT*WHERE *B*1=*bbb*)

Figure 12:
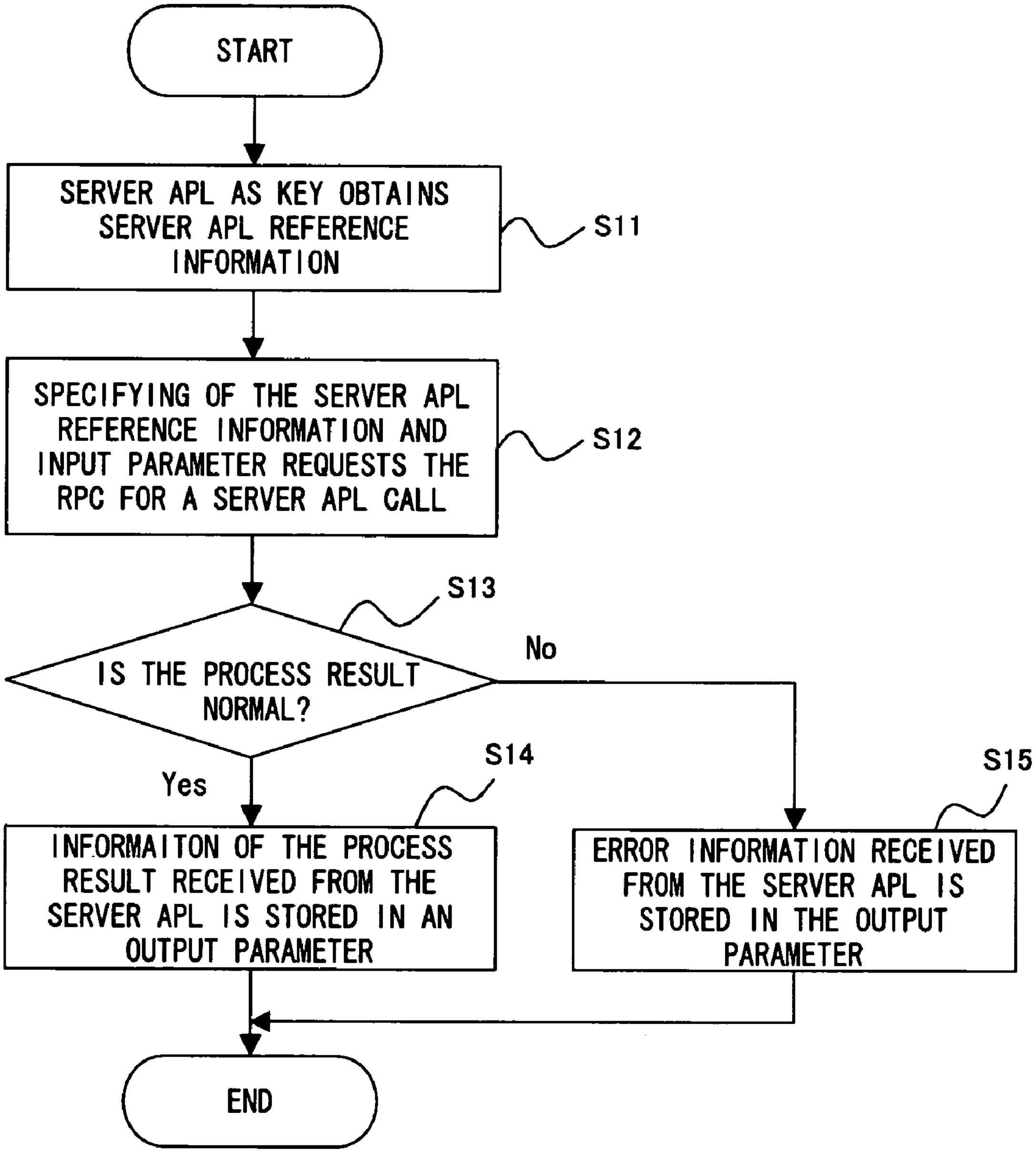
FIG. 12 shows a flow chart of STUB 24 generated by a "STUB (CL) generation" process in S2.

FIG. 12 shows a flow chart of STUB 24 generated by a "STUB (CL) generation" process in the step S2. First, a server APL as key obtains server APL reference information (S11).

The source code 21 of an application includes a database name described along with a DML. The server APL name is automatically generated by the intelligent compiler 20 based on the database name. If the automatically generated name overlaps with a server APL name already existing in the RPC system, the user may specify a server APL name at the time of an execution of the intelligent compiler 20.

Meanwhile, the server APL reference information is stored in an RPC naming service, and is address information (i.e., address) required at the time of the RPC/CL connecting to the RPC/SV. This will be described in association with FIG. 13.

Then, specifying of the server APL reference information and input parameter request the RPC for a server APL call (S12).

Then, a judgment is made whether or the process result received from the RPC is normal (S13). If the process result is normal, the information of the process result received from the server APL is stored in an output parameter (S14). If the process result is abnormal, the error information received from the server APL is stored in the output parameter (S15).

Here, the description is of an address solution-use source code. The address solution-use source code means process logic for an application obtaining server APL reference information as pre-process of an RPC client STUB call in an RPC.

Note that an address solution-use source code (i.e., a pre-process of an RPC client STUB call) is noted within an application in a common RPC, the present embodiment, however, is configured to embed it as a process within an RPC client STUB. The relationship is shown in FIG. 14.

Figure 13:
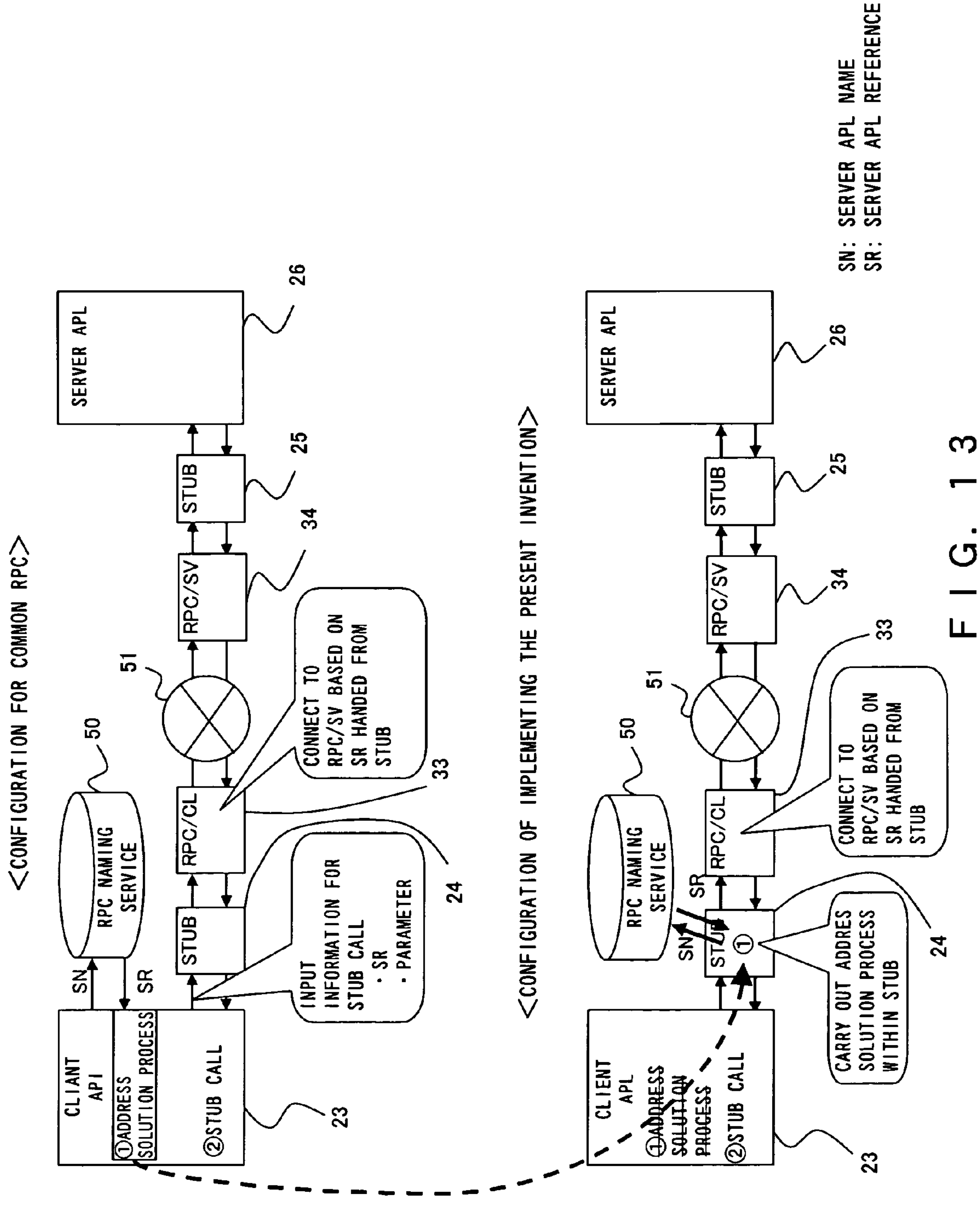
FIG. 13 is a diagram describing an address solution-use source code according to the present embodiment.

FIG. 13 is a diagram describing the address solution-use source code according to the present embodiment. The upper part of the drawing shows a configuration implementing an address solution process in a client APL for a common RPC. The lower part shows a configuration implementing an address solution process in a client STUB for an RPC according to the present embodiment. The numerical sign 50 indicates an RPC naming service and the 51 indicates a network.

In the case of a configuration implementing an address solution process in a client APL for a common RPC, a server APL name is handed to an RPC naming service 50 from "(1) address solution process" within the client APL and then server APL reference information corresponding to the server APL name is returned from the RPC naming service 50. Then, "(2) STUB call" is called, and server APL reference information and an input parameter are handed to the STUB 24 as the input information. An RPC/CL 33 connects to an RPC/SV 34 based on the server APL reference information handed from the STUB 24.

Comparably, in the case of implementing an address solution process in a client STUB for an RPC according to the present embodiment, the STUB 24 is called by "(2) STUB call" through a client API. Then, "(1) address solution process" is carried out in the STUB 24, a server APL name is handed to the RPC naming service 50 from which server APL reference information corresponding to the server APL name is then returned. The RPC/CL 33 connects to the RPC/SV 34 based on the server APL reference information handed from the STUB 24.

The reason for the present embodiment being configured differently from a common RPC as described above is to localize processes which depends on the kind of an RPC such as CORBA/RMI, et cetera, by absorbing in a STUB, thereby avoiding an inclusion in an application as much as possible.

Note that the implementation may be as a common configuration. In the case of adopting a common configuration, the intelligent compiler 20 needs to be modified so as to replace a DML call process within an application with two processes, i.e., "(1) address solution process" and "(2) STUB call process".

Note that the present embodiment does not require a coding for the address solution process by an application developer, and rather the compiler automatically generates the code from a DML coded by the application developer, and therefore an RPC different from a common configuration as described above does not levy a load on the application developer.

FIG. 14 exemplifies a simplified pseudo-code corresponding to the flowchart shown by FIG. 12. The pseudo-code shown by FIG. 12 is generated as a source code 24*a* by the process of the intelligent compiler 20 in the step S2. The STUB 24 is defined by a STUB name: Application ServerStub, an input parameter: c4, output parameters: c1 [ ], c2 [ ], c3 [ ], c4 [ ], c5 [ ] and c6 [ ], a return code: rc, and an error code: er.

The S11 obtains server APL reference information sr by a server APL name "ServerAplDB_C" as key. The server APL name "ServerAplDB_C" is a name automatically generated at the time of a compilation based on a DB name "virtual database C". An "rpcXXX_naming_service_lookup is a naming service corresponding to a designated RPC category.

The S12 designates server APL reference information sr, an input parameter c4, output parameters: _rc, _er, _c1 [ ], _c2 [ ], _c3 [ ], _c4 [ ], _c5 [ ] and _c6 [ ] for "rpcXXX_call", thereby requesting for a server APL call.

If a process result of the server APL is normal (i.e., rc==OK) in the S13, the S14 stores information of the process result received from the server APL in the output parameters c1, c2, c3, c4, c5 and c6.

If the process result of the server APL is judged to be abnormal in the S13, the S15 stores error information, which is received from the server APL, in the output parameter er.

FIG. 15 shows a flow chart of a STUB 25 generated by a "STUB (SV) generation" process in the S3. First, server APL reference information and an input parameter are designated and a server APL is called (S21).

Then a judgment is made as to whether or not a process result by the called server APL is normal (S22). If the process result is normal, the normal process result is returned to the RPC (S23). If the process result is abnormal, then error information is returned to the RPC (S24).

FIG. 16 exemplifies a simplified pseudo-code corresponding to the flowchart shown by FIG. 15. The pseudo-code shown by FIG. 16 is generated as a source code 25*a* by a process of the intelligent compiler 20 in the S3.

The STUB 25 is defined by a STUB name: DatabaseServerStub, input parameters sr (ServerAplReference) and c4, output parameters: rc, er, c1 [ ], c2 [ ], c3 [ ], c4 [ ], c5 [ ] and c6 [ ].

The S21 designates server APL reference information, an input parameter c4, output parameters: _rc, _er, _c1 [ ], _c2 [ ], _c3 [ ], _c4 [ ], _c5 [ ] and _c6[ ] for "serverAplDb_C", thereby requesting for a server APL call. The server APL name "serverAplDb_C" is a name automatically generated at the time of a compilation based on a DB name "virtual database C".

If the process result received from the server APL is judged to be normal in the S22 (i.e., _rc==OK), the S23 stores information of the process result, which is received from the server APL, in the output parameters c1 [ ], c2 [ ], c3 [ ], c4 [ ], c5 [ ] and c6 [ ].

If the process result of the server APL is judged to be abnormal, the S24 stores error information, which is received from the server APL, in the output parameter er.

The next description is of the source code 23*a* in which a DML execution process of the source code 21 of the application is replaced by an RPC by the "DML-RPC replacement process" in the S4.

FIG. 17 shows source codes of an application in the pre- and post-"DML RPC replacement process (S4)". Referring to FIG. 17, a virtual database DML execution process described in the source code of an application is replaced by an RPC client STUB call process by the input and output information extracted in the S1.

As shown in FIG. 17, a part of the source code 21 of the application is replaced by the process in the S4. Note that a rule may be set for a description format in order to speed up a replacement process by the compiler, or the standard rule of the applicable programming language may be complied in lieu of setting a specific rule. The "@" line in FIG. 17 exemplifies a rule for a high speed replacement.

The next description is of the correlation table generation process of the S5.

FIG. 18 shows the correlation table generated in the S5. The correlation table 60 is generated by referring to the mapping repository 22 (refer to FIG. 10). The correlation table 60 is disposed for indicating a correlation between the variables (64, 65 and 66) and instruction (63) of the DML of a virtual database (61), and the native database (62).

As described above, a virtual database DML according to an example of the present embodiment is:

$$DML\ (\text{SELECT*WHERE } B1=bbb)$$

and therefore, the DML instruction (63) stores "SELECT". The input information (64) stores "C4" according to FIG. 11. And the expansion form (65) stores "C4 (bbb)" because the value of the C4 is "bbb" according to FIG. 11.

From the mapping repository 22 (refer to FIG. 10), a native database (66) corresponding to the input information is the database "B", a record element (67) as the target of DML is "B1" and its attribute (68) is "String".

And according to FIG. 11, the output information (64) stores "*" (i.e., all elements) and its expansion form (65) stores "C1", "C2", "C3", "C4", "C5" and "C6".

From the mapping repository 22 (refer to FIG. 10), a native database (66) corresponding to the input information "C1" is the database "A", a record element (67) as the target of DML is "A1" and its attribute (68) is "date". Native databases (66) corresponding to the output information "C2" is the databases "A" and "B", and record elements (67) as the target of DML are "A2" and "B2", respectively, with their attributes (68) being "Integer" and "String", respectively. A native database (66) corresponding to the output information "C3" is the database "A", a record element (67) as the target of DML is "A3" and its attribute (68) is "Character". A native database (66) corresponding to the output information "C4" is the database "B", a record element (67) as the target of DML is "B1" and its attribute (68) is "String". A native database (66) corresponding to the output information "C5" is the database "B", a record element (67) as the target of DML is "B3" and its attribute (68) is "String". A native database (66) corresponding to the output information "C6" is the database "B", a record element (67) as the target of DML is "B4" and its attribute (68) is "Date".

The next description is of the creation of a schedule table of the native databases in the S6.

FIG. 19 shows a schedule table 70 generated in the S6. The schedule table 70 stores, in the server APL, the scheduled contents of "what processing sequence" (process sequence), "which processing category" (process category), to "which native data base" (database) and a "process of what content" (process content) is to be carried out. The schedule table 70 is generated based on the correlation table 60 shown by FIG. 18.

The process sequence 1 (simply "Pro 1" hereinafter) stores a process category "access" and a database "B", with the process content being "extract a record of the database B, of which the record element B1 is equal to bbb".

The process sequence 2 (simply "Pro 2" hereinafter) stores a process category "data type conversion", with the process content being "convert a value of a record element B2 of the process result record of the Pro 1 from a String type (B2) into an Integer type (A2)". The data type conversion refers to the mapping repository 22 (refer to FIG. 10) and converts from a String type (B2) into an Integer type (A2).

The process sequence 3 (simply "Pro 3" hereinafter) stores a process category "access" and a database "A", with the process content being "extract a record of the database A, of which a value of the record element A2 is equal to a value acquired in the Pro 2".

The process sequence 4 (simply "Pro 4" hereinafter) stores a process category "result assembly" and databases "A, B", with the process content being "assemble a search result of a virtual database from the search results of the databases A and B in the Pro 2 and Pro 3".

Based on the schedule table 70 generated as described above, the intelligent compiler 20 generates a source code 26*a* of the RPC server APL as described in the following.

Figure 20:
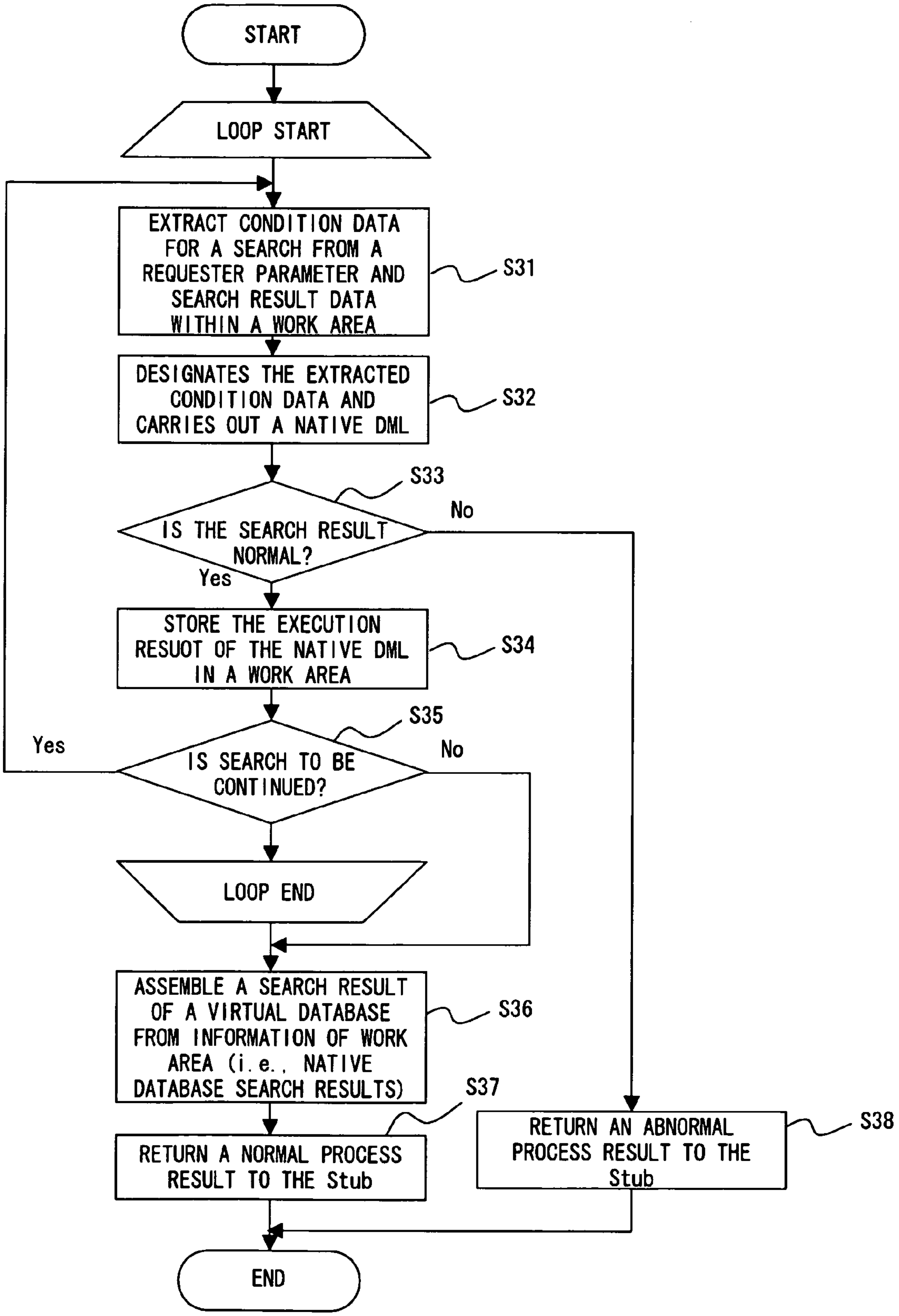
FIG. 20 shows a flow chart of a server APL 26 generated by a "sever APL generation" process based on the schedule table 70 in S6.

FIG. 20 shows a flow chart of a server APL 26 generated by a "sever APL generation" process based on the schedule table 70 in the S6. This flow is disposed for searching a plurality of databases according to a search schedule (i.e., the schedule table 70) determined by the intelligent compiler 20.

Note that the server APL flow depends on a DML description of a virtual database for an application designed by a developer and on a mapping of the virtual database and native databases. The flow chart shown by FIG. 20 is noted within the range of common logic which is independent of these factors.

The first is to extract condition data for a search from a requester parameter and search result data within a work area (S31). Only the first time extracts the condition data for a search from the requester parameter, while the second time and thereafter extract the condition data for a search from the search result data within the work area. Note that search result data is stored in the work area in S34 as described later.

The next designates the condition data extracted in the S31 for a native DML, and carries out the native DML (S32), where the native DML means carrying out a DML for a DBMS of a native database.

The next judges whether or not the search result by carrying out the native DML is normal (S33). Specifically, the process result of the carried-out native DML, that is, the return code from the DBMS, constitutes the judgment condition. If the search result is abnormal, the abnormal result is returned to the STUB 25 (S38). If the search result is normal, the result of carrying out the native DML is stored in the work area (S34). The result stored in the work area is used for the subsequent search in S31.

Then a judgment is made as to whether or not a search is continued (S35), followed by repeating the processes of S31 through S35 for the number of native databases.

When finishing searches of all the native databases as targets of search, pieces of information of the work area (i.e., search results of the native databases) are assembled to make a search result of the virtual database (S36). The normal search result of the virtual database is returned to the STUB 25 (S37).

FIGS. 21A and 21B exemplify a simplified pseudo-code corresponding to the flowchart shown by FIG. 20. The pseudo-code 26*a* shown by FIGS. 21A and 21B is generated by the process of the S6 by the intelligent compiler 20 based on a schedule table.

The RPC server APL 26 is defined by a server APL name: ServerAplDb_C, input parameters: sr and c4, output parameters: _rc, _er, _c1 [ ], _c2 [ ], _c3 [ ], _c4 [ ], _c5 [ ] and _c6 [ ].

The RPC server APL 26 searches a plurality of native databases according to a search schedule (i.e., the schedule table 70) determined by the intelligent compiler 20. The Pro 1, Pro 2, Pro 3 and Pro 4 shown in FIGS. 21A and 21B correspond to the Pro 1, Pro 2, Pro 3 and Pro 4 shown in FIG. 19.

The first is to carry out the following S31 through S34 and S38 in order to extract a record of the database B, of which a record element B1 is equal to bbb. The S31 extracts condition data for a search from the requester parameter c4 and stores it in a parameter b1.

The S32 designates the extracted condition data and carries out a native DML (i.e., "SELECT B1, B2, B3, B4 WHERE B1=b1") for a native database B.

If the search result by carrying out the native DML is judged to be normal (i.e., rc==OK) in the S33, the S34 stores the result of carrying out the native DML in the work areas b1 [i], b2 [i], b3 [i] and b4 [i] (which is repeated while the next record exists in the search result).

If the search result by carrying out the native DML is judged to be abnormal in the S33, then the S38 returns the abnormal process result is to the STUB.

The next converts the value of the record element B2 of a process result record of the Pro 1 from a String type (B2) into an Integer type (A2) (in the Pro 2), followed by storing the converted value in a work area a [i].

The next carries out the S31 through S34 and S38 in order to extract a record of the database A, of which the value of a record element A2 is equal to the value acquired in Pro 2 (in the Pro 3). The S31 extracts condition data for a search from the search result data a2 [i] within the work area and stores it in a parameter a2.

The S32 designates the extracted condition data and carries out a native DML (i.e., "SELECT A1, A2, A3 WHERE A2=a2") for the database A.

If the search result of carrying out the native DML is judged to be normal (i.e., rc==OK) in the S33, the S34 stores the result of carrying out the native DML in the work areas a1 [j], a2 [j] and a3 [j] (which is repeated while the next record exists in the search result).

If the search result of carrying out the native DML is judged to be abnormal in the S33, the S38 returns the abnormal process result to the STUB.

The next is to carry out the S36 through S37 in order to assemble a search result of the virtual database from the search results of the databases A and B in the Pro 2 and Pro 3 (in the Pro 4). The S36 carries out the following process for each array element. That is to store search results a1 [j], a2 [j], a3 [j], b1 [i], b3 [i], and b4 [i] of the databases A and B, which are stored in a work area, in the output parameters _c1 [j], _c2 [j], _c3 [j], _c4 [j], _c5 [j] and _c6 [j], respectively, as the search result of the virtual database. The S37 returns the normal search result of the virtual database to the STUB 25.

The next description is of a load module conversion carried out in the S7. With the following source code as input, a compilation is carried out based on a programming language describing the aforementioned source code (which is a common language compilation process and therefore a detailed description is omitted herein):

Application (a source code after a DML-RPC conversion) output of S4

RPC client STUB: output of S2

RPC server STUB: output of S3

RPC server APL: output of S6

As described above, the intelligent compiler 20 generates the application 23, RPC client STUB 24, RPC server STUB 25 and RPC server APL 26. The following description is of a virtual database remote access system disposing these load modules in an execution environment.

Figure 22:
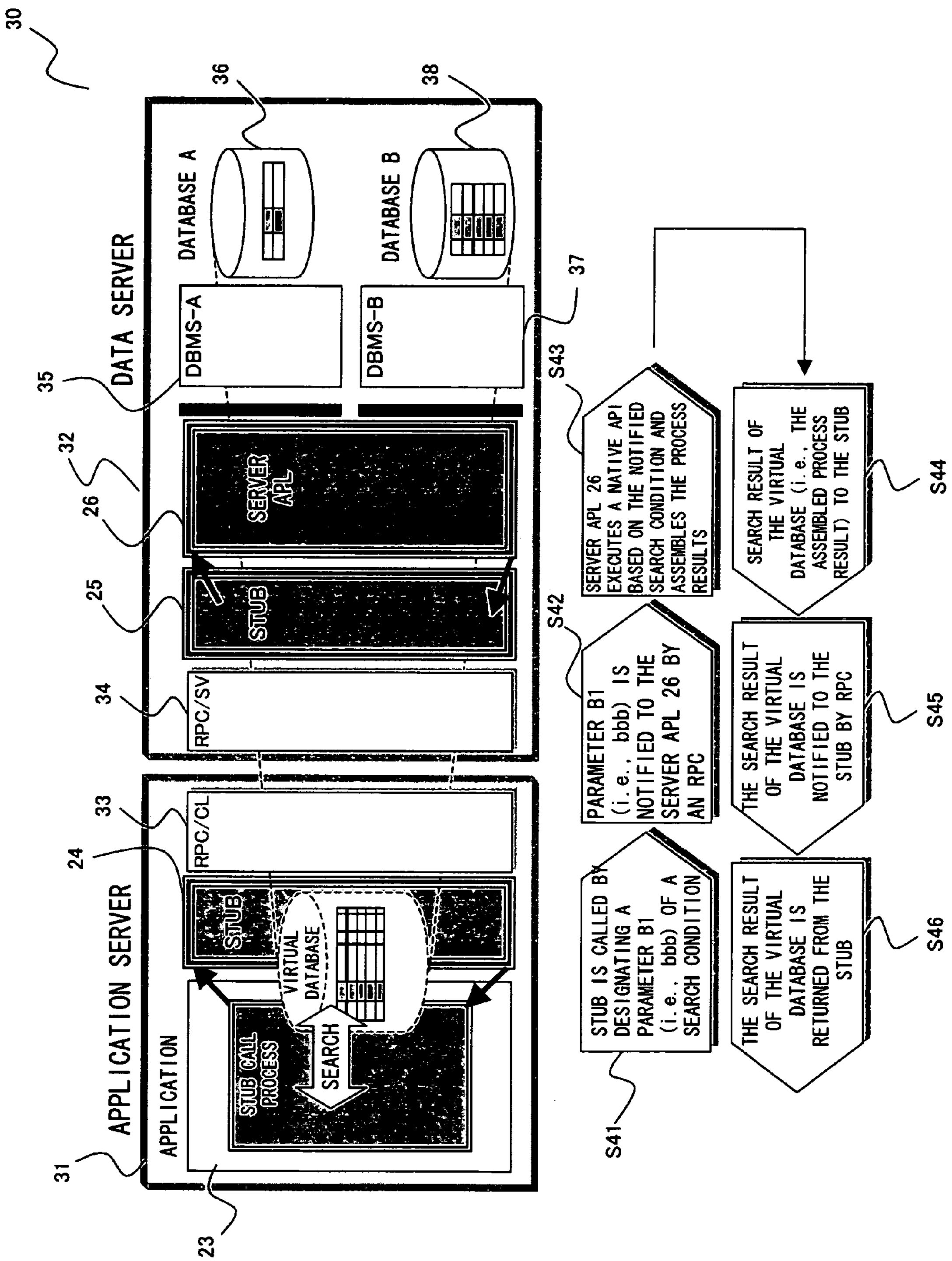
FIG. 22 shows a virtual database remote access system equipped with four load modules obtained by the intelligent compiler 20 according to the present embodiment.

FIG. 22 shows a virtual database remote access system equipped with four load modules obtained by the intelligent compiler 20 according to the present embodiment. The application 23 and RPC client STUB 24 which are generated by the intelligent compiler 20 are deployed in the application server 31. The RPC server STUB 25 and RPC server APL 26 which are obtained by the intelligent compiler 20 are deployed in the data server 32.

As described above, a DML execution process for a virtual database is converted into a STUB call process in the application 23 by the intelligent compiler 20.

Now, the description is of a usage example of the virtual database remote access system 30. The user inputs a search condition (i.e., an input parameter) for the virtual database remote access system 30, that is, inputs an input parameter to the application server 31.

In the STUB call process of the application 23, the STUB 24 is called by designating a parameter B1 (i.e., bbb) of a search condition (S41). Then, the parameter B1 (i.e., bbb) is notified to the server APL 26 by an PRC by way of a remote STUB 25 (S42).

The server APL 26 executes a native application program interface (API) based on the notified search condition. Then, the DBMS-A (35) and DBMS-B (37) respectively carry out search processes for the database A (36) and database B (38) and hand the search process results to the server APL 26 which in turn assembles the respective search results obtained from the individual DBMSs to make it a search result as a virtual database (S43).

The server APL 26 returns the search result of the virtual database to the STUB 25 (S44). The search result of the virtual database is notified to the STUB 24 by an RPC (S45). The search result of the virtual database is returned to the application 23 from the STUB 24 (S46). Then the application 23 provides the user with the search result of the virtual database.

Note that the description of the present embodiment exemplifies the case of including one input parameter and six output parameters, the input and output parameters may be statically changed according to a usage in lieu of being limited by the example.

Figure 23:
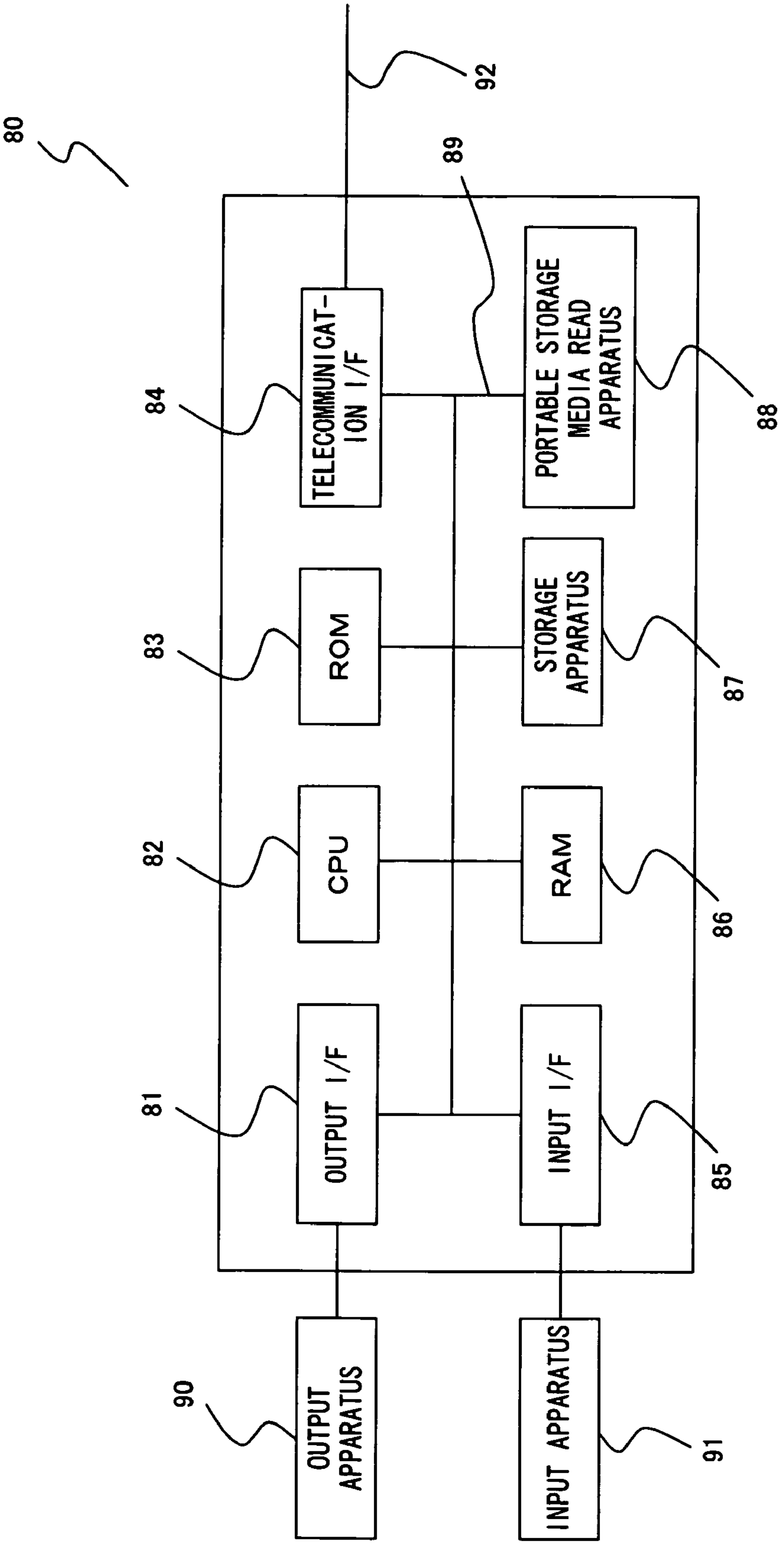
FIG. 23 is a configuration block diagram of a hardware environment carrying out the intelligent compiler 20 according to the present embodiment.

FIG. 23 is a configuration block diagram of a hardware environment carrying out the intelligent compiler 20 according to the present embodiment. Referring to FIG. 23, a computer 80 comprises a CPU (central processing unit) 82, read only memory (ROM) 83, random access memory (RAM) 86, a telecommunication interface (simply "I/F" for "interface" hereinafter) 84, a storage apparatus 87, an output I/F 81, an input I/F 85, a read apparatus 88 for portable storage media, a bus 89 interconnecting the aforementioned components, an output apparatus 90 being connected to the output I/F 81 and an input apparatus 91 being connected to the input I/F 85.

The storage apparatus 87 can utilize various forms of storage apparatuses such as hard disk and magnetic disk. The storage apparatus 87 or ROM 83 stores the intelligent compiler program used for the above described embodiment. The storage apparatus 87 also stores the mapping repository, et cetera.

The program according to the present embodiment may be stored in the storage apparatus 87 for example from a program provider by way of a network 89 and a telecommunication I/F 84. The program may be stored in a commercially available portable storage medium in circulation for setting in a read apparatus 88 and being executed by the CPU 82. A portable storage medium can utilize various forms of storage media including CD-ROM, flexible disk, optical disk, magneto optical disk, IC card, et cetera, in which the program is stored to be read by the read apparatus 88.

The input apparatus 91 can utilize key board, mouse, electronic camera, microphone, scanner, sensor, tablet, et cetera. The output apparatus 90 can utilize display, printer, speaker, et cetera. The network 89 may be a telecommunication network including Internet, LAN, WAN, dedicated line, wireline, wireless, et cetera.

As described above, a Remote Procedure Call (RPC) makes the number of telecommunication only one return trip, i.e., a call and a return, independent of a description content of a DML for searching a virtual database. A telecommunication overhead is also reduced in comparison with the conventional method because communication data are only a parameter for a search and search result data.

As to the schedule for the analysis, disassembly and assembly processes of a virtual DML, the present invention is contrived to make it possible to expand the analysis, disassembly and assembly processes of a virtual DML as logic of a server APL statically (at the time of a compilation), as opposed to the conventional method of referring to a mapping repository dynamically for executing the schedule. Therefore, the present invention reduces an overhead of a schedule process, thereby accomplishing a high performance access.

The present invention also enables an automatic generation of a configuration by the intelligent complier even in the case of designing a business system by the configuration installing an application only at the application server. This accordingly eliminates a necessity of a design adjusting an interface between two applications in such a system configuration in which the respective applications of an application server and a data server collaborate with each other, such as the Stored Procedure, and therefore the present invention makes it possible to reduce a load on the developer at the time of a design.

The present invention enables a facilitation of design and development, and a speeding up of an access for an application which is independently developed at an application server side. Incidentally, a DML of a virtual database can utilize a discretionary DML such as SQL (i.e., a table access) and XQuery (i.e., an XML access); a native database can utilize a discretionary DB such as RDB, NDB, VSAM and XML-DB; and an RPC can utilize a discretionary RPC such as CORBA, Java-RMI, Microsoft-COM.

Meanwhile, a mapping repository premises techniques including ODMG (http://www.odmg.org), Hibernate (http://www.hibernate.org), SQL/XML (http://www.sqlx.org), et cetera.

Note that the present invention can be changed to various configurations or embodiments possible within the scope thereof in lieu of being limited by the embodiments put forth in the above description.

A use of the present invention enables a high performance remote database access while applying a virtual database function aiming at facilitating a business logic buildup.

What is claimed is:

1. A storage medium storing a program to be executed by a computer for use by an application program to remote access a virtual database system that virtualizes one or more native databases as one virtual database, the virtual database system including a first computer furnished with the application program receiving a prescribed input parameter from a user, and a second computer which is connected to the first computer by way of a network and includes the one or more native databases, wherein execution of the program by the computer comprising:

a source code input process to receive a source code of said application program;

an input and output information extraction process to extract input and output information relating to a data manipulation language (DML) execution process for the virtual database from said source code based on data structure relationship information storing information relating to a relationship of data structures between the one or more native databases and virtual database;

a RPC replacement process to replace a source code that includes a description part relating to the DML execution process for the virtual database with a replacement source code that includes a description relating to a remote procedure call (RPC) process; and a native DML execution program generation process to generate a native DML execution program that is to execute a DML execution process for the native databases based on the RPC process, wherein the native DML execution program generation process includes:

a process to generate correlation information indicating a correlation among a DML instruction included in the DML execution process for said virtual database, said extracted input and output information comprising at least an input parameter given to the DML instruction and at least an output parameter outputted by the DML execution process, and one or more data items constituting a record of said native databases, based on the data structure relationship information; and a process to generate schedule information for a process executed by the aforementioned native DML execution program generation process based on said correlation information, the schedule information including an execution of a process for assembling results of the DML execution process for each of said one or more native databases and for making it one result of the DML execution process for said virtual database.

2. The storage medium according to claim 1, wherein said schedule information includes information relating to a processing sequence of said one or more native databases or which process is to be executed.

3. The storage medium according to claim 1, wherein the native DML execution program generation process furthermore converts a DML execution process for said native databases into a source code based on said schedule information.

4. The storage medium according to claim 1, further comprising:

an interface generation process for generating a first interface stored in said first computer and a second interface stored in said second computer in order to use said RPC.

5. The storage medium according to claim 4, further comprising a compilation process for compiling a source code of said application program of which a description part relating to said DML execution process has been replaced by a description relating to an RPC process, a source code relating to said first interface, a source code relating to said second interface and a source code of said native DML execution program, thereby generating respective load modules.

6. A production method for a virtual database remote access-use program for generating a program for use in a remote access to a virtual database system virtualizing, for an application program, native databases as one database, the virtual database system comprising a first computer furnished with an application program receiving a prescribed input parameter from a user, and a second computer which is connected to the first computer by way of a network and includes one or more databases which are the native databases, the production method comprising:

inputting a source code of said application program;

extracting input and output information relating to a data manipulation language (DML) execution process for the virtual database from said source code based on data structure relationship information storing information relating to a relationship of data structures between the one or more native databases and virtual database;

replacing a source code that includes a description part relating to the DML execution process for the virtual database with a replacement source code that includes a description relating to a Remote Procedure Call (RPC) process; and generating a native DML execution program that is a program for executing a DML execution process for the native databases based on the RPC process, wherein generating said native DML execution program includes generating correlation information indicating a correlation among a DML instruction which is included in a DML execution process for said virtual database, said extracted input and output information comprising at least an input parameter given to the DML instruction and at least an output parameter outputted by the DML execution process, and one or more data items constituting a record of said native databases, based on the data structure relationship information, and generating schedule information executed by said native DML execution program based on said correlation information, the schedule information including an execution of a process for assembling results of DML execution processes for each of said native databases and for making it one result of the DML execution process for said virtual database.

7. The production method for a virtual database remote access-use program according to claim 6, wherein said schedule information includes information relating to a processing sequence of said native databases or which process is to be executed.

8. The production method for a virtual database remote access-use program according to claim 6, further converting, the DML execution process for said native databases into a source code based on said schedule information.

9. The production method for a virtual database remote access-use program according to claim 6, further generating a first interface stored in said first computer and a second interface stored in said second computer in order to use said RPC.

10. The production method for a virtual database remote access-use program according to claim 9, further compiling a source code of said application program of which a description part relating to said DML execution process has been replaced by a description relating to an RPC process, a source code relating to said first interface, a source code relating to said second interface and a source code of said native DML execution program, thereby generating respective load modules.

11. A remote access method for a virtual database system virtualizing, for an application program, native databases as one database, the virtual database system comprising a first computer furnished with an application program receiving a prescribed input parameter from a user, and a second computer which is connected to the first computer by way of a network and includes one or more databases which are the native databases, the remote access method comprising:

the first computer stores the application program and a first interface for carrying out a Remote Procedure Call (RPC);

the second computer stores a native Data Manipulation Language (DML) execution program for executing a DML execution process for the native databases and a second interface for carrying out a Remote Procedure Call (RPC);

the application program, having received the input parameter, calls the first interface;

the first interface hands the input parameter to the second interface by the RPC;

having received the input parameter from the second interface, the native DML execution program carries out the DML execution process for each of the native databases, stores the execution results obtained from the respective native databases based on the DML execution process in a work area, assembles the execution results, stored in the work area, obtained from the respective native databases for making one execution result, and returns the assembled one execution result to the first interface through the RPC; and the assembled one execution result returned by the application program as an execution result of the virtual database is provided.

12. The remote access method for a virtual database according to claim 11, wherein said native DML execution program carries out said DML execution process for another of said native databases based on an execution result of the DML execution process for one native database among said plurality of native databases.

13. The storage medium according to claim 1, wherein the description relating to the RPC process is a process of calling a RPC client stub.

14. The storage medium according to claim 13, further comprising a compilation process which generates an application with the replaced source code, the RPC client stub, a RPC server stub and a server application.

* * * * *